(12) United States Patent
Ganesan et al.

(10) Patent No.: US 7,363,353 B2
(45) Date of Patent: Apr. 22, 2008

(54) CONTENT SERVICE AGGREGATION DEVICE FOR A DATA CENTER

(75) Inventors: Elango Ganesan, Palo Alto, CA (US); Ramesh Panwar, Pleasanton, CA (US); Yen Lee, San Jose, CA (US); Chau Anh Ngoc Nguyen, San Jose, CA (US); John Phillips, Santa Clara, CA (US); Yuhong Andy Zhou, Alameda, CA (US); Gregory G Spurrier, Sunnyvale, CA (US); Sankar Ramanoorthi, San Jose, CA (US); Michael Freed, Pleasanton, CA (US); Mark Bryers, Granite Bay, CA (US); Nazar Zaidi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 682 days.

(21) Appl. No.: 10/191,746

(22) Filed: Jul. 8, 2002
(Under 37 CFR 1.47)

(65) Prior Publication Data
US 2003/0069973 A1    Apr. 10, 2003

Related U.S. Application Data

(60) Provisional application No. 60/303,355, filed on Jul. 6, 2001.

(51) Int. Cl.
*G06F 15/16*   (2006.01)
(52) U.S. Cl. ................ 709/218; 709/203; 709/201; 370/235

(58) Field of Classification Search ............... 709/226, 709/246, 238, 232, 218, 201, 203; 370/474, 370/389, 235
See application file for complete search history.

(56) References Cited

U.S. PATENT DOCUMENTS 5,613,136 A    3/1997   Casavant et al.

(Continued)

OTHER PUBLICATIONS

Harmon, William "32-Bit Bus Master Ethernet Interface for the 68030 (Using the Macintosh SE/30)," Apr. 1993.

(Continued)

*Primary Examiner*—William Vaughn
*Assistant Examiner*—Djenane Bayard
(74) *Attorney, Agent, or Firm*—Shumaker & Sieffert, P.A.

(57) ABSTRACT

An architecture for controlling a multiprocessing system to provide at least one network service to subscriber data packets transmitted in the system using a plurality of compute elements, comprising a management compute element including service set-up information for at least one service and at least one processing compute element applying said at least one network service to said data packets and communicating service set-up information with the management compute element in order to perform service specific operations on data packets. In a further embodiment, a method of controlling a processing system including a plurality of processors is disclosed. The method comprises the steps of operating at least one of said processors as a control authority providing service provisioning information for a subscriber; and operating a set of processors as a service specific compute element responsive to the control authority, receiving provisioning information from the subscriber and performing service specific instructions on data packets to provide IP content services.

31 Claims, 16 Drawing Sheets

U.S. PATENT DOCUMENTS

| | | | |
|---|---|---|---|
| 5,721,855 | A | 2/1998 | Hinton et al. |
| 6,223,260 | B1 | 4/2001 | Gujral et al. |
| 6,374,329 | B1 | 4/2002 | McKinney et al. |
| 6,405,289 | B1 | 6/2002 | Arimilli et al. |
| 6,510,164 | B1 * | 1/2003 | Ramaswamy et al. ...... 370/466 |
| 6,636,242 | B2 | 10/2003 | Bowman-Amuah |
| 6,816,905 | B1 * | 11/2004 | Sheets et al. ............... 709/226 |
| 6,952,728 | B1 * | 10/2005 | Alles et al. .................. 709/224 |
| 2001/0042190 | A1 | 11/2001 | Tremblay et al. |
| 2002/0007443 | A1 | 1/2002 | Gharachorloo et al. |
| 2002/0038339 | A1 * | 3/2002 | Xu .............................. 709/203 |
| 2002/0105972 | A1 | 8/2002 | Richter et al. |
| 2003/0097428 | A1 | 5/2003 | Afkhami et al. |

OTHER PUBLICATIONS

Troutman, Denise "DP83916EB-AT: High Performance AT Compatible Bus Master Ethernet Adapter Card," Nov. 1992.

* cited by examiner

Control Authority

IPSEC

Firewall, Nat Forwarding

Example: IKE VPN Processing

CONTENT SERVICE AGGREGATION DEVICE FOR A DATA CENTER

CLAIM OF PRIORITY

The present application claims priority to U.S. Provisional Patent Application Ser. No. 60/303,355, entitled "CONTENT SERVICE AGGREGATION SYSTEM CONTROL ARCHITECTURE", which application was filed on Jul. 6, 2001.

BACKGROUND OF THE INVENTION

1. Field of the Invention

The present invention is directed to a system for implementing a multifunction network service apparatus, and in particular, to a control architecture for a content service apparatus realized using a multi-processor hardware device.

2. Description of the Related Art

The worldwide system of computer networks known as the Internet has provided business and individuals with a new mechanism for supplying goods and services, and conducting commerce. As the number and type of network services used on the Internet have grown, so has the strain that providing such services places on businesses. As the number, complexity and interaction of inter-networked services has risen, the associated costs of building and maintaining a network infrastructure to support those services have grown as well. Many enterprises have thus turned outsourced vendors, sometimes called managed service providers or data centers, to provide these services in lieu of building and maintaining the infrastructure themselves. Customers of such managed service providers are often called subscribers.

The managed service provider can operate in many different ways. Typically it can provide secure facilities where the infrastructure service equipment is located, and manage equipment for the subscriber. The scope of management and services is defined by an agreement with the subscriber calling for the managed service provider to solely or jointly manage the equipment with the subscriber. This is sometimes referred to as "co-location". In other cases, the managed service provider can lease the physical space from another provider (called a hosting provider) and provide just the management of the infrastructure equipment on behalf of its subscribers.

A data center is a specialized facility that houses Web sites and provides data serving and other services for subscribers. The data center may contain a network operations center (NOC), which is a restricted access area containing automated systems that constantly monitor server activity, Web traffic, and network performance. A data center in its most simple form may consist of a single facility that hosts all of the infrastructure equipment. However, a more sophisticated data center is normally an organization spread throughout the world with subscriber support equipment located in various physical hosting facilities.

Data centers allow enterprises to provide a number of different types of services, including e-commerce services to customers; extranets and secure Virtual Private Networks (VPNs) to employees and customers; firewall protection and Network Address Translation (NAT) services, Web caching and load balancing services, as well as many others. These services can all be provided at an off-site facility in the data center without requiring the enterprise to maintain the facility itself.

A typical data center facility will house physical hardware in a number of equipment racks, generally known as "cages", which hold networking equipment and servers which are operated by the data center on behalf of the subscriber. Generally, the subscriber maintains the content and control over the servers, while contracting with the data center to provide services such as maintenance and service configuration. It should be well understood that there are myriad ways in which subscribers can arrange their relationships with data centers.

The equipment that provides the infrastructure services for a set of subscribers can take several forms. Depending on the complexity and variety of services required, the equipment generally includes one or more single function devices dedicated to the subscriber. Generally, because the devices are designed with the co-location model in mind—customers leasing rack space and pieces of equipment as needed—service devices generally include the ability to provide only one or a few services via the device. Typical multi-function devices that do combine services combine those that are closely related, such as NAT and firewall services. A data center facility generally has a number of devices to manage, and in many case the devices multiply as redundant devices may be used for fail over security to provide fault-tolerance or for load balancing.

Normally, services such as NAT, Firewall and VPN are provided by specialized computers or special function appliances at the subscribers site. In offloading the services to a data center, the data center will use specialized appliances or servers coupled to the subscribers Web servers in the cages to implement special functions for the subscribers. These appliances can include service provision devices and the subscriber's application servers as well as other specialized equipment for implementing the subscriber's service structure. The cages may thus include network appliances dedicated to one or more of the following tasks: routing, firewall, network address translation, Secure Sockets Layer (SSL) acceleration, virtual private networking, public key infrastructure (PKI), load balancing, Web caching, or the like. As a result, the management of all subscribers within the data center becomes very complex and expensive with many different management interfaces for all of the subscribers and subscriber devices. Administering the equipment in each cage is generally accomplished via an administrative access interface coupled to each single function device.

An example of one prior art architecture used in a data center is shown in FIG. 1. In this example, a plurality of individual service appliances 24, each providing a different type of IP service, are coupled to a network 20 (in this case it is the Internet) and a local LAN 21, which is a high speed local network secure within the data center. The local LAN may couple each of the appliances to each other, as well as various subscriber servers 25. Each of the individual appliances 24 performs only some limited form of processing which is specific to the service function it is designed to provide. In addition, this type of architecture is difficult to manage since each device 24 has its own configuration interface 26. All service set-up parameters must be made within each device. Indeed, each appliance may be provided by a different manufacturer and hence have its own configuration paradigm.

In general, each of these appliances 24 works on network data packets carried in the network using TCP/IP protocol. The data is routed between appliances using the full TCP/IP stack, requiring that each appliance process the entire stack in order to apply the service that the appliance is designed to provide. This results in a large degree of processing overhead just in dealing with the transmission aspects of the data. To combat these problems, some network equipment manufacturers have built multi-service devices capable of providing additional IP level services in one physical package. Typically, however, these devices couple network coupled "line cards" designed to provide the particular value added service to the network with some form of central processor, with the combination being generally organized into multi-service routing device. The compute elements on the line cards have limited or specialized processing capability, and all services set-up and advanced processing must go through the central processing card. Such service set-up is sometimes called "slow path" processing, referring to that occurs infrequently or is complex, such as exception packet handling, while more routine functions are performed by the appliances themselves.

An example of this type of system is shown in FIG. 2. In the system shown in FIG. 2, a central processor 30 controls and performs all service implementation functions, with some routing via other appliances coupled to the fabric. In this architecture, the service processing is limited to the speed and throughput of the processor. Each of the line cards may perform Layer 3 and some higher layer processing, but the processing element performs service set up and generally comprises a special function central processing unit.

An important drawback to the systems of the prior art such as those shown in FIG. 1 and FIG. 2 is that processing of application services requires each line card to perform the full IP stack functions. That is, each card must perform IP processing and routing to perform the network service on the data carried by the IP packet. Any packet entering the line card must be processed through the IP, TCP and HTTP level, the data processed, and the packet re-configured with proper TCP and IP information before being forwarded on.

A second important drawback of these systems is that they perform processing on only one flow of packets at a time. That is, the central processor of the embodiment of FIG. 2 is a bottleneck for system performance.

SUMMARY OF THE INVENTION

The invention, roughly described, comprises an architecture for controlling a multiprocessing system to provide a network service to network data packets using a plurality of compute elements. In one aspect, a single service is provided by multiple compute elements. In a second aspect, multiple services are provided by multiple elements. In one embodiment, the invention may comprise a management compute element including service set-up information for at least one service; and at least one processing compute element communicating service set-up information with the management compute element in order to perform service specific operations on data packets. This embodiment may further include a flow element, directing data packets to the at least one processing compute element.

The system control architecture providing multiple network IP services to networked data in a multiprocessing system, the multiprocessing system having a plurality of compute elements, comprising code provided on a first compute element causing the compute element to function as a control compute element maintaining multi-service management information and service configuration instructions; and service processing code provided on at least a second compute element causing said second compute element to function as a service processing element performing service specific instructions responsive to the control compute element on data transmitted to the service processing element.

The system control architecture of claim 2 further includes code, provided on a third compute element, causing said third compute element to function as a flow stage compute element communicating with the control compute element and the service processing element.

In a further aspect, the system may comprise a method of controlling a processing system including a plurality of processors. The method may include the steps of operating at least one of said processing units as a control authority including service provisioning information for a subscriber; and operating a set of processors as service specific compute elements responsive to the control authority, receiving provisioning information from the subscriber and performing service specific instructions on data packets to provide content services. In this embodiment, data packets having common attributes including a common subscriber may be (but need not be) organized in a flow and processed by the set of processors, with each flow being bound to the same set of processors. Each subscriber may have multiple flows.

In a still further embodiment of the invention, a method of operating a multiprocessor system is disclosed. The method may comprise operating at least one processor as a control authority storing information on configuration of a plurality of network services, operating at least a second processor as a compute element for one of said services, and transmitting selected information on the configuration of the services to the compute element to operate the compute element to perform calculations on the service.

In a still further aspect, the invention may comprise system for processing content services using a processing pipeline in a multi-processor system. In this embodiment, the invention includes at least one processor comprising a Control Authority having service specific data and instructions; a plurality of service specific processors arranged in a processing pipeline and coupled by a switching fabric, communicating with the Control Authority to receive set-up information and perform service specific instructions on packet data; and a flow processor directing network traffic to the service specific processors. In this embodiment, the data input to the architecture is organized as a flow, and each flow is bound to a processing pipeline for service specific operations.

The present invention can be accomplished using hardware, software, or a combination of both hardware and software. The software used for the present invention is stored on one or more processor readable storage media including hard disk drives, CD-ROMs, digital versatile discs (DVDs), optical disks, floppy disks, tape drives, random access memory (RAM), read-only memory (ROM) or other suitable storage devices. In alternative embodiments, some or all of the software can be replaced by dedicated hardware including custom integrated circuits, gate arrays, field programmable gate arrays (FPGAs), programmable logic devices (PLDs), and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
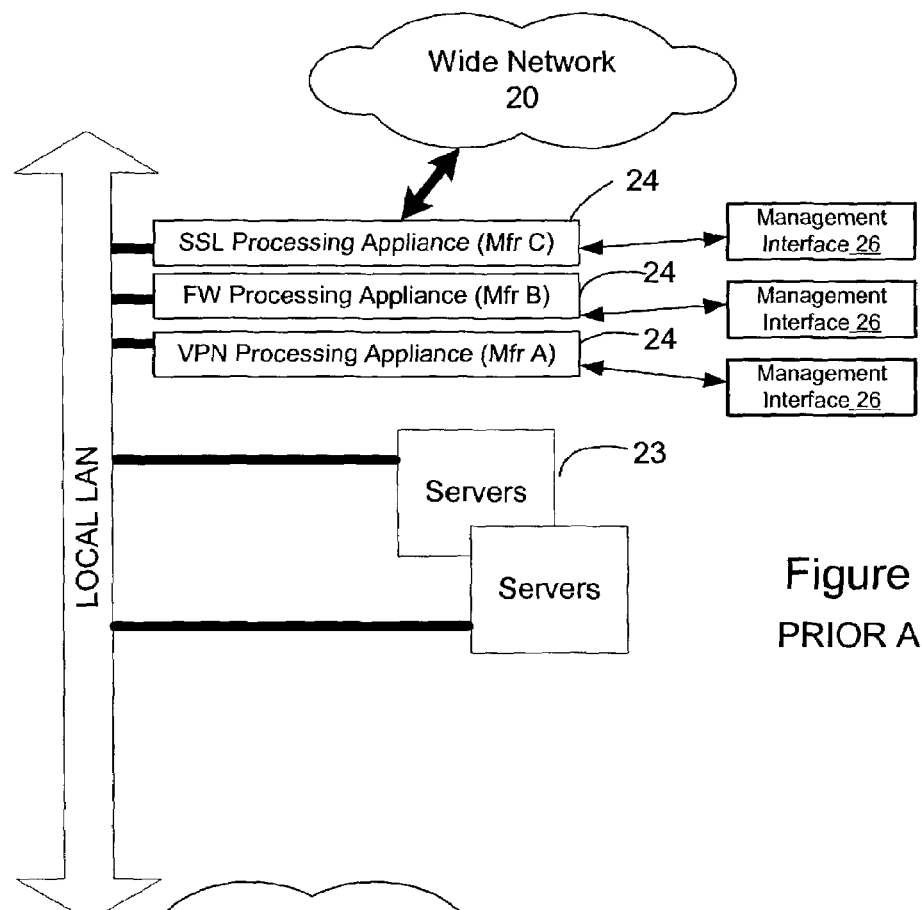
FIG. 1 depicts a first prior art system for providing a plurality of network services to a subscriber.
Figure 2:
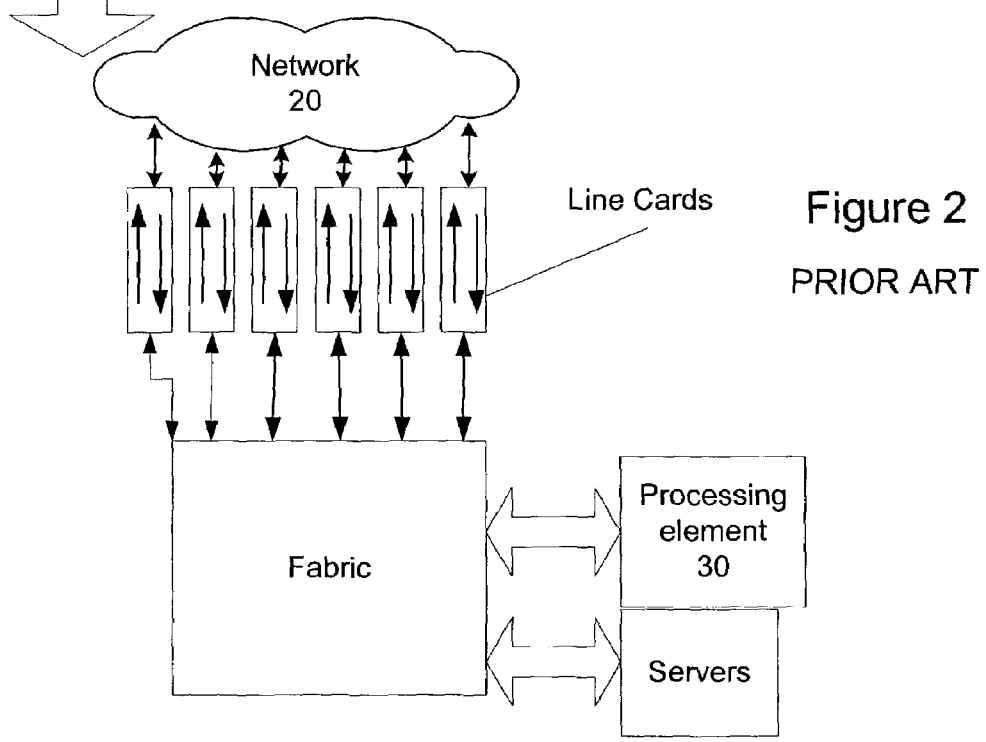
FIG. 2 depicts a second prior art system for providing a plurality of network services to a subscriber.

The present invention provides an architecture for controlling a content services aggregator—a device which provides a number of network services. The architecture is designed to provide the services on a multi-processor system. In one aspect, the invention comprises a software architecture comprised of an operating paradigm optimized for packet routing and service processing using multiple compute elements coupled through a switching fabric and control backplane.

Various embodiments of the present invention will be presented in the context of multiple hardware architectures. It should be recognized that the present invention is not limited to use with any particular hardware, but may be utilized with any multiple compute element architecture allowing for routing of packets between compute elements running components of the invention as defined herein.

In the following detailed description, the present invention is described by using flow diagrams to describe either the structure or the processing that implements the method of the present invention. Using this manner to present the present invention should not be construed as limiting of its scope. The present invention contemplates both methods and systems for controlling a multiprocessor system, for implementing content services to a multitude of subscribers coupled to the multiprocessing system, and for distributing the provision of such services across a number of compute elements. In one embodiment, the system and method of the invention can be implemented on general-purpose computers. The currently disclosed system architecture may also be implemented with a number of special purpose systems.

Embodiments within the scope of the present invention also include articles of manufacture comprising program storage apparatus and having encoded therein program code. Such program storage apparatus can be any available media which can be accessed by a general purpose or special purpose computer. By way of example, and not limitation, such program storage apparatus can comprise RAM, ROM, EEPROM, CD-ROM or other optical disk storage, magnetic disk storage or other magnetic storage devices, or any other medium which can be used to store the desired program code and which can be accessed by a general purpose or special purpose computer. Combinations of any of the above are also included within the scope of such program storage means.

Program code comprises, for example, executable instructions and data which causes a general purpose or special purpose computer to perform a certain function or functions. Overview The software architecture of the present invention provides various content based networking services to subscribers in a network environment. In one embodiment, the system architecture of the present invention is designed to run on processing hardware which is located in a network configuration between a physical layer interface switch and a "Layer 2" IP switch. The architecture supports multiple subscribers and multiple subscriber services in accordance with the invention.

Figure 3:
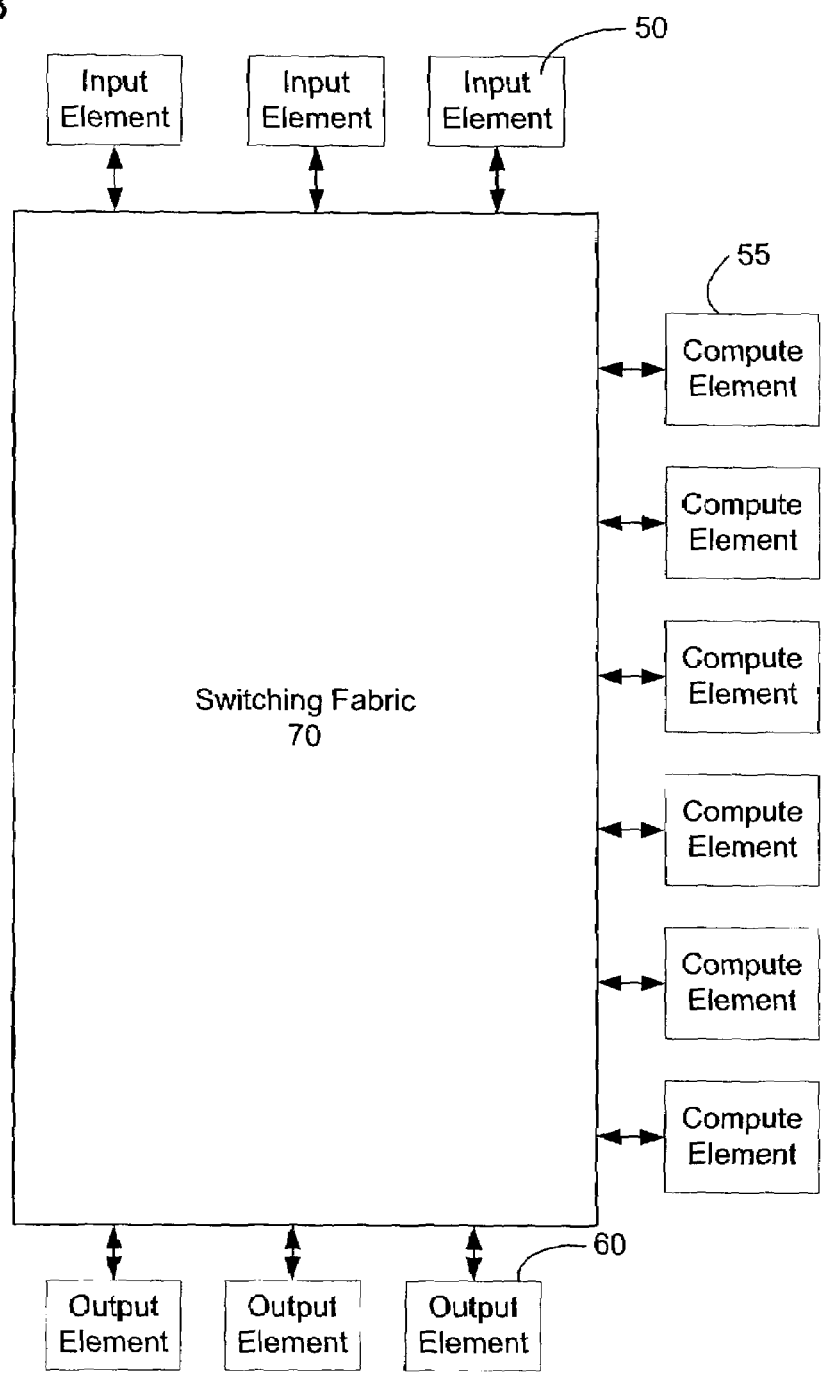
FIG. 3 depicts a general hardware embodiment suitable for use with the service provision architecture of the present invention

A general hardware architecture on which the software architecture of the present invention may be implemented is shown in FIG. 3. As shown therein, a plurality of compute elements are coupled to a switching fabric to allow packets to traverse the fabric and be routed through means discussed below to any other compute element coupled to the fabric. It should be understood that the hardware shown in FIG. 3 may comprise a portion of a content service aggregation, but does not illustrate components of the aggregator such as I/O ports, busses and network interfaces which would be used in such aggregators.

In general, packets enter the system via the input elements, get switched via the fabric and travel through one or more compute elements where the services are rendered and exit via the output elements. The function of the control system of the present invention is to route data packets internally within the system, maintain the data structures which allow the services provided by the content services aggregation device to be performed, and coordinate the flows of data through the system.

When implemented with a multiprocessor device such as that shown in FIG. 3, the control architecture of the present invention provides a content service aggregator which distributes service provision over a plurality of compute elements in order to increase the processing performance of the device beyond that presently known in the art. In combination with this distributed processing, any number of compute elements may be provided.

In the depiction shown in FIG. 3, each compute element may comprise one or more microprocessors, including any commercially available microprocessor. Alternatively, the compute elements may comprise one or more application-specific integrated circuit processors specifically designed to process packets in accordance with the network service which the content service aggregator is designed to provide. Each compute element in FIG. 3 includes at least a processing unit, such as a CPU. As discussed below, each compute element may include a number of CPUs and function specific processing engines. Not detailed in FIG. 3 but utilized in the present invention is some form of addressable memory. In the implementation of FIG. 3, the memory may be incorporated into the compute elements themselves, or provided separately and may be memory dedicated to and accessible by one processor or memory shared by many processors.

In FIG. 3, certain elements have been designated as "input elements", other elements have been designated as "output elements", while still other elements have been designed as simply "compute" elements. As will become clear after the reading of the specification, the designation of the elements as input, output or compute elements is intended to enable the reader to understand that certain elements have functions which are implemented by the software architecture of the present invention as controlling processing flow (the input/output elements) and performing service provisioning.

Figure 4:
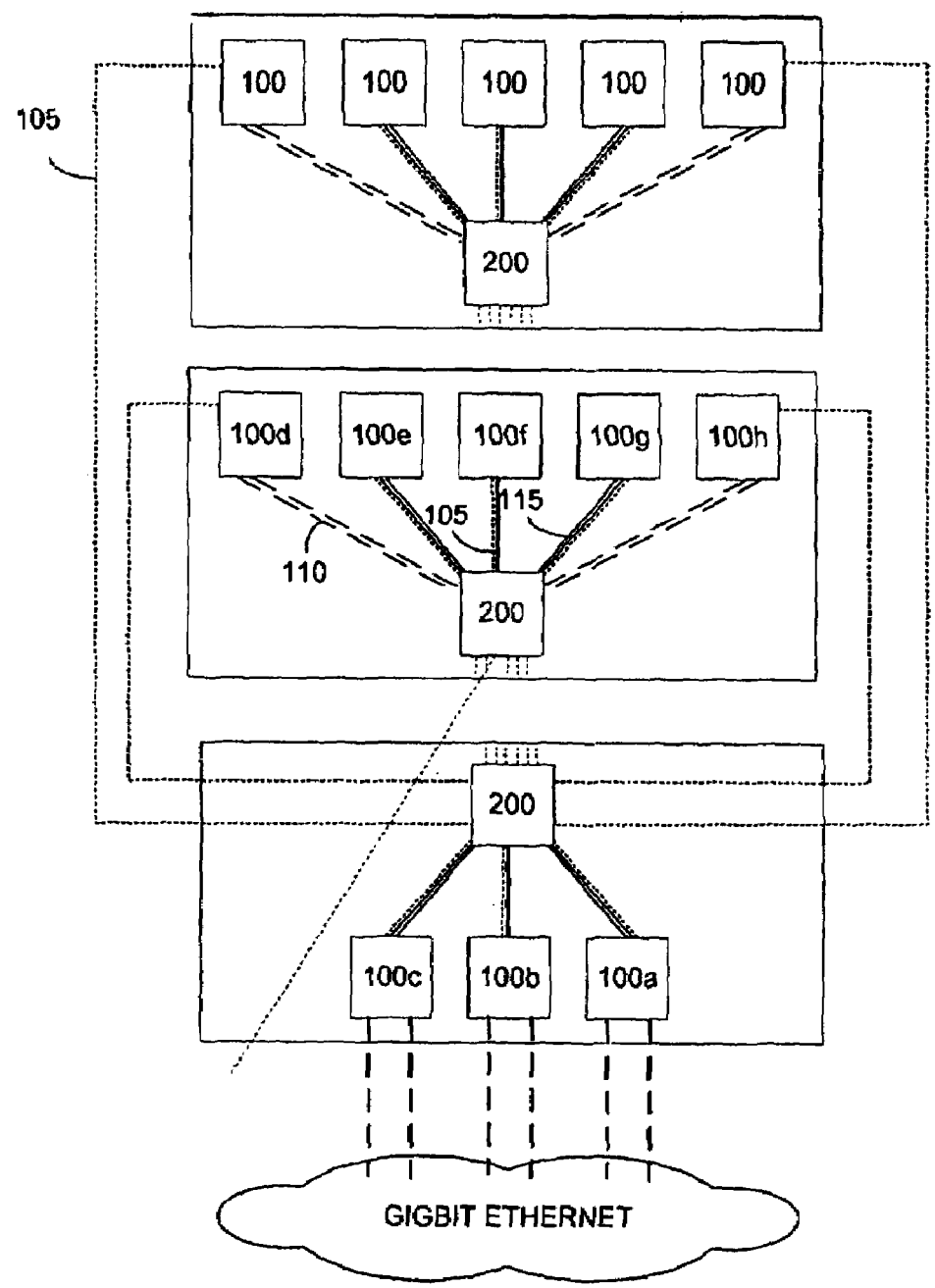
FIG. 4 depicts a second hardware embodiment suitable for use with the service provision architecture of the present invention.

FIG. 4 shows a more specialized hardware configuration that is suitable for use with the system of the present invention. In this particular embodiment, the compute elements 100 are a series of multi-CPU compute elements, such as those disclosed in co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, which is hereby fully incorporated by reference herein. Briefly, each compute element contains a plurality of CPUs, application specific processing engines, a shared memory, a sequencer and a media access control (MAC) address.

In addition, the switching fabric is comprised of a plurality of crossbar switching elements 200, such in this those described in co-pending U.S. patent application Ser. No. 09/900,514, filed Jul. 6, 2001 by Abbas Rashid, Nazar Zaidi, Mark Bryers and Fred Gruner entitled CROSS-BAR SWITCH, which is hereby fully incorporated by reference herein.

In order to implement a content service aggregation device using the embodiment of FIG. 4, a plurality of compute elements 100 are organized onto a processing pipeline or "blade". Each blade may comprise a physical card having a series of connectors and connections, including wiring interconnecting the compute elements and at least one switching element 200 to a connection plane and other such blades. In FIG. 4, the system may include two processor pipelines, each having five compute elements and one switching element provided thereon, as well as an input output blade including three compute elements and one switching element 200. The input/output pipeline processing elements 100 are coupled to a gigabit Ethernet connection.

It should be recognized that the compute elements need not be provided on the blades, and that different configurations of input/output schemes are possible. In a further embodiment, the content services aggregator may include two input blades and two processing blades or any number of processing and input blades.

Each blade includes a series of packet path data connections 115, control path connections 105 and combined data and control connections 110. The collection of compute elements on a single blade provides a processing pipeline for providing the content services. It should be recognized that the processing pipeline need not be physically separated on a blade in any particular configuration, but may comprise a series of processors linked by a crossbar switch, a grouping of crossbar switches, or other switching fabric capable of routing packets in the manner specified in the instant application to any of the various compute elements coupled to the switch.

As noted above, the hardware suitable for running the system of the present invention may comprise any multi-processor system having addressable memory operatively coupled to each processor. However, the compute elements shown in FIG. 4 and taught in co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM each include a central processing unit coupled to one or more coprocessor application engines. The coprocessor application engines are specifically suited for servicing applications assigned to the compute element. This enables different compute elements to be optimized for servicing a number of different applications provided by the content service aggregator. For example, one compute element may contain coprocessor application engines for interfacing with a network, while another compute element includes different coprocessor application engines. The coprocessors application engines also offload associated central processing units from processing assigned applications. The coprocessors application engines perform the applications, leaving the central processing units free to manage the allocation of applications. The coprocessors application engines are coupled to a cache memory to facilitate their application processing. Coprocessors application engines exchange data directly with cache memory—avoiding time consuming main memory transfers found in conventional computer systems. The service aggregation system may also couples cache memories from different compute elements, allowing them to exchange data directly without accessing main memory.

As such, the architecture shown in FIG. 4 is particularly suited for use in a content service aggregation device and, in accordance with the particular implementations shown in the co-pending applications, provides a high throughput system suitable for maintaining a large number of subscribers in a data center.

Although the particular type of hardware employed in running the software architecture of the present invention is not intended to be limiting on the scope of the software control architecture of the present invention, the invention will be described with respect to its use in a hardware system employing a configuration such as that shown in FIG. 4, where the compute elements are those shown and described with respect to co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, and the cross-bar fabric elements are those shown and described with respect to co-pending U.S. patent application Ser. No.

09/900,514, filed Jul. 6, 2001 by Abbas Rashid, Nazar Zaidi, Mark Bryers and Fred Gruner entitled CROSS-BAR SWITCH.

The control system of the present invention takes into account the fact that communication overhead between any two elements is not the same and balances the process for best overall performance. The control system allows for a dynamically balanced throughput, memory usage and compute element usage load among the available elements, taking into account the asymmetric communications costs. The architecture also scales well for additional processors and groups of processors. The architecture can host as few as a single subscriber and as many as several thousand subscribers in an optimal fashion and handles dynamic changes in subscribers and the bandwidth allocated to them.

There are a number of different types of traffic which are recognized by the system of the present invention, including local traffic, remote traffic, control traffic and data traffic, as well as whether the traffic is inbound to the content services aggregator or outbound from the aggregator. The processors of FIG. 3 and the processing pipelines of FIG. 4 may handle these flows differently in accordance with the system of the invention.

In one embodiment, each input/output processor on the blade may have a local and a remote port with Gigabit Ethernet interfaces. The interfaces fall under one of the following categories: local port, remote port; trusted management port; port mirror or inter-device RP. Local ports connect to a trusted side of the device's traffic flow (i.e. a cage-side or the subscriber-side) and hence have "local" traffic. Remote ports connect to the un-trusted side (the internet side) of the device's traffic flow. A trusted management port is the out of band management port used to access the content services aggregator and is physically secured. Data on this port has no access control and no firewalls are applied to traffic coming in from this port. An inter-device RP port is used to connect two content services aggregators in redundant mode. Port mirror is a debug feature that duplicates the traffic of a local or remote port for debugging purposes.

Software Hierarchy

Figure 5:
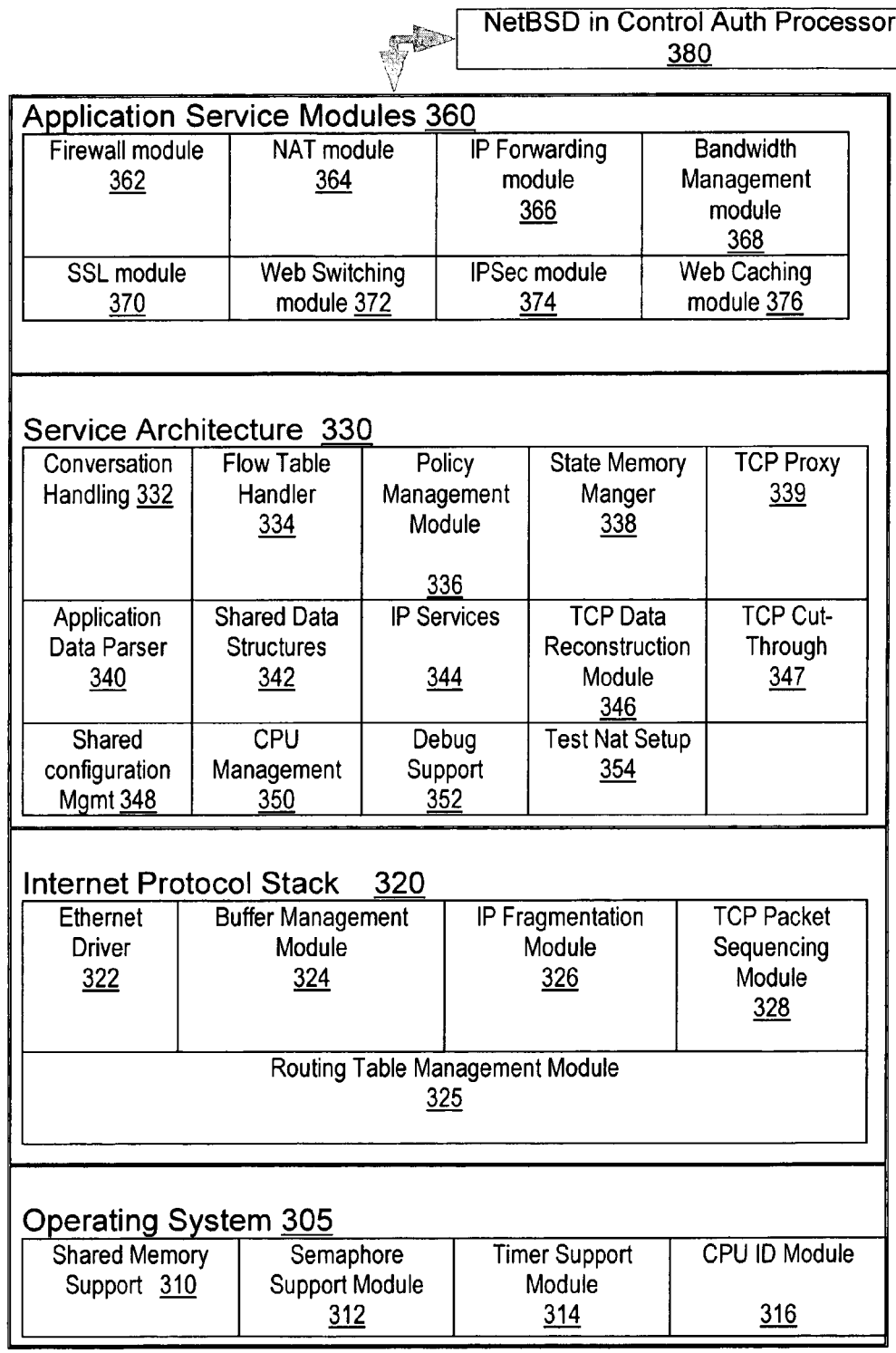
FIG. 5 is a block diagram illustrating the software system architecture of the control system of the present invention.

As shown in FIG. 5, the software architecture is a four layer hierarchy which may include: an operating system layer 305, an internet protocol (IP) stack 320, a service architecture layer 330 and a network services layer 360. Each layer has a number of sub-components as detailed below. The top layer is the content application services layer which includes modules implementing the various IP services. Those listed in FIG. 5 are Firewall, Network Address Translation, IP Forwarding (OSPF Routing), bandwidth management, Secure Sockets Layer processing, Web (or Layer 7) content based switching, Virtual Private Networking using IPSec, and Web caching. It should be understood that the number and type of Web services which may be provided in accordance with the architecture of the present invention are not limited to those shown in FIG. 5, and those listed and described herein are for purposes of example. Additional services may be added to those shown in FIG. 5 and in any particular implementation, all services shown in FIG. 5 need not be implemented.

In one embodiment, each processing compute element is configured to run with the same software configuration, allowing each processing compute element to be used dynamically for any function described herein. In an alternative embodiment, each compute element is configured with software tailored to the function is designated to perform. For example, if a compute element is used in providing a particular service, such as SSL, the processing compute element will only require that code necessary to provide that service function and other content services codes need not be loaded on that processor. The code can be provided by loading an image of the code at system boot under the control of a Control Authority processor. It should be further understood that, in accordance with the description set forth in co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, the compute elements may be tailored to provide certain computational aspects of each service in hardware, and each service module 360 and service architecture module 330 may be constructed to take advantage of the particular hardware configuration on which it is used.

Shown separate from the architecture stack and running on one or more compute elements, is a NetBSD implementation that serves as the Control Authority for the system of the present invention. As will be understood to one of average skill in the art, NetBSD is a highly portable UNIX-like operating system. The NetBSD implementation provides support and control for the content services running in the content services aggregator. Although in one implementation, a single instance of NetBSD running on a single processing CPU may be utilized, in order to provide a high throughput for the content services aggregator, multiple instances of NetBSD are preferably utilized in accordance with the invention. Such multiple instances may be provided on multiple processors, or, when the system is utilized with the compute element of co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, multiple copies of NetBSD may be provided on a single compute element.

In both examples, the single or multiple copies of NetBSD running on a single or multiple CPUs respectively, comprise the "Control Authority" and control the operation of the system as a whole. In one implementation, eight copies of NetBSD are run on the compute element of co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM and are divided into specific tasks where seven total processors are used and run independent copies of NetBSD: 3 are dedicated for the OSPF processes; 3 are dedicated for IKE/PKI processes; 1 is dedicated for the management processes; and one is a spare.

As the name implies, the Control Authority manages the system. Specifically, it handles such items as: system bring up; fault tolerance/hot swaps; management functions; Simple Network Management Protocol (SNMP); logging functions; command line interface parsing: interacting with the Network Management System such as that disclosed in co-pending U.S. patent application Ser. No. 09/900,482, filed Jul. 6, 2001 by Elango Gannesan, Taqi Hasan, Allen B. Rochkind and Sagar Golla, entitled NETWORK MANAGEMENT SYSTEM and U.S. patent application Ser. No. 10/190,036, filed Jul. 5, 2002 by Taqi Hasan and Elango Ganesan, entitled INTEGRATED RULE NETWORK MANAGEMENT SYSTEM, which applications are hereby fully incorporated by reference into the instant application; layer 2 and layer 3 routing functions; Internet Control Message Protocol (ICMP) generation and handling; OSPF processes; and IKE/PKI processes. As noted above, the Control Authority supports Internet Key Exchange/Public Key Infrastructure (IKE/PM), Open Shortest Path First (OSPF) routing, fault tolerance and management processes on one or more NetBSD compute elements or CPUs.

Traffic to and from the Control Authority may take several forms: local port traffic to the Control Authority, traffic from the Control Authority to the local port, aggregator-to-aggregator traffic, or control traffic passing through the crossbar switch. Local to Control Authority traffic may comprise out-of-band management traffic which is assumed to be secure. This is the same for Control Authority traffic moving to the local port. Control traffic from inside the device may take several forms, including event logs and SNMP updates, system status and system control message, in-band management traffic, IKE/PKI traffic and OSPF traffic.

At boot, each compute element may perform a series of tasks including initialization of memory, load translation look aside buffer (TLB), a micro-code load, a basic crossbar switch configuration, a load of the NetBSD system on the Control Authority processor and finally a load of the packet processing code to each of the compute elements. The Control Authority processor NetBSD implementation may boot from a non-volatile memory source, such as a flash memory associated with the particular compute element designated as the Control Authority, or may boot via Trivial File Transfer Protocol (TFTP) from a network source. The Control Authority can then control loading of the software configuration to each compute element by, in one embodiment, loading an image of the software specified for that element from the flash memory or by network (TFTP) load. In each of the image loads, one or more of the modules shown in FIG. 5 may be installed in the compute element. Each compute element uses the operating system 305, but subsets of higher layers (320, 330, 360) or all of said modules; may be used on the compute elements.

Operating system 305 is the foundation layer of system services provided in the above layers. Operating system 305 provides low-level support modules that higher layers rely on, such as shared memory support module 310, semaphore support module 312 and timer support module 314. These support modules are illustrated in FIG. 5. In addition, a CPU identification module 316 is provided to allow for individual CPU identification.

The operating components shown in FIG. 5 are run on each of the service processing compute elements, which are those compute elements other than the one or more compute elements which comprise the Control Authority. In certain implementations, compute elements have a shared memory resource for CPUs in the compute element. For the shared memory function, one CPU needs to initialize the memory in all systems before all processors can start reading a shared memory region. In general, the initialization sequence is required by one of the processors with access to the shared memory region, but the initialization processor is not in a control relationship with respect to any other processor. The initialization processor maps the shared memory to agreed-upon data structures and data sizes. The data structures and semaphore locks are initialized and a completion signal is sent to the processors.

In general, each CPU can issue a series of shared memory allocation calls for an area of the shared memory region mapped to application data structures. After the call, the application accesses the data structures through application-specific pointers. The sequence of calls to the shared memory allocation is the same in all processors and for all processes, since the processors are all allocating from the same globally shared memory pool. Each processor other than the master processor must perform a slave initialization process where it initializes the data sizes and structures of the master and waits for the completion signal from the master CPU.

Semaphore support module 312 implements Portable Operating System Interface (POSIX) semantics. A semaphore library is provided and a memory based semaphore type is also provided to enable data locking in the shared memory. Wait and post calls are provided for waiting for lock to be free, and releasing the lock on a particular memory location. The initialization will generally set the memory location to a free state (1). The wait loop will loop until the lock is free and set the lock value to locked (0) to acquire the lock. The post call releases the lock for the next available call. Additional POSIX interfaces are also implemented to provide a uniform interface for dealing with each of the compute elements.

The timer support module 314 implements two abstract data types: a timer handler, which is a callback function for timer expiration and takes a single void parameter with no return value; and a timestamp function, which is an object used short time information. The functions exported by the timer module are: timer_add, which allows the controller to add a timer callback given a time, handler, and generic parameters; a timer_timestamp which returns the current timestamp; a timer_timeout which checks for timeouts given the timestamp and timeout value; and the timer_tostring which is a debug return printable string for the timestamp.

CPU identification module 316 provides for unique CPU identification. There are three exported functions including an initialization module, an obtained ID module, and a get ID module. The obtained ID module allows a system to obtain the unique CPU ID in a Linux-like manner. The CPU ID function allows the return of the CPU ID for the CPU.

Returning to FIG. 5, the next level of the software architecture of the present invention implements an IP stack 320. IP stack 320 provides functionality is that is normally found in the networking portion of the operating system area. In addition IP stack 320 provides various TCP/IP services. IP stack 320 may be is optimized for performance. An important feature of IP stack 320 is that it is distributed. Multiple processors with a shared memory may share the processing of IP packets in the stack.

In the IP stack, the Ethernet driver 322 is responsible for interfacing with the hardware functions such as receiving packets, sending packets, and other Ethernet functions such as auto negotiation. Is also responsible for handling buffer management as needed by the hardware.

The buffer management module 324 acts as interface between Ethernet driver and the balance of the system. The buffer manager performs and handles how buffers are dispatched and collected.

The IP fragmentation module 326 is responsible for identifying a fragmented IP packets and collecting them into a linked list of frames. A routing table management module 325 is responsible for maintaining forwarding tables used by IP forwarding and routing. It is responsible for interacting with the routing module on the Control Authority compute element. A TCP packet sequencer 328 is provided to collect and send out packets in an original ordering and is utilized when a subscriber requires packets to be read in order. This sequencer is used as an optional processing step that can be disabled and suffer no performance loss.

Other modules, which are provided in the IP stack, include timeout support, ARP support, echo relay support, a MAC driver and debug support.

Returning again to FIG. 5, the next level in the architecture is the service architecture 330. The service architecture 330 provides support for the flow control and conversation based identification of packets described below. The service architecture 330 is a flow-based architecture that is suitable for implementing content services such as firewall, NAT bandwidth management, and IP forwarding.

Service architecture 330 is a distributed system, using multiple microprocessors with shared memory for inter-processor communications and synchronization. The system uses the concept of a "flow" to define a series of packets, with multiple flows defining a "conversation."

A flow is defined as all packets having a common: source address, source port, destination address, destination port, subscriber ID, and protocol. As packets travel through the content service aggregator, each packet is identified as belonging to a flow. (As discussed below, this is the task of the Control Authority and input/output compute elements.) The flows are entered into flow tables which are distributed to each of the compute elements so that further packets in the same flow of can be identified and suitable action on the packet applied in rapid fashion. If the traffic is remote to local, a forwarding table lookup is performed.

Figure 6A:
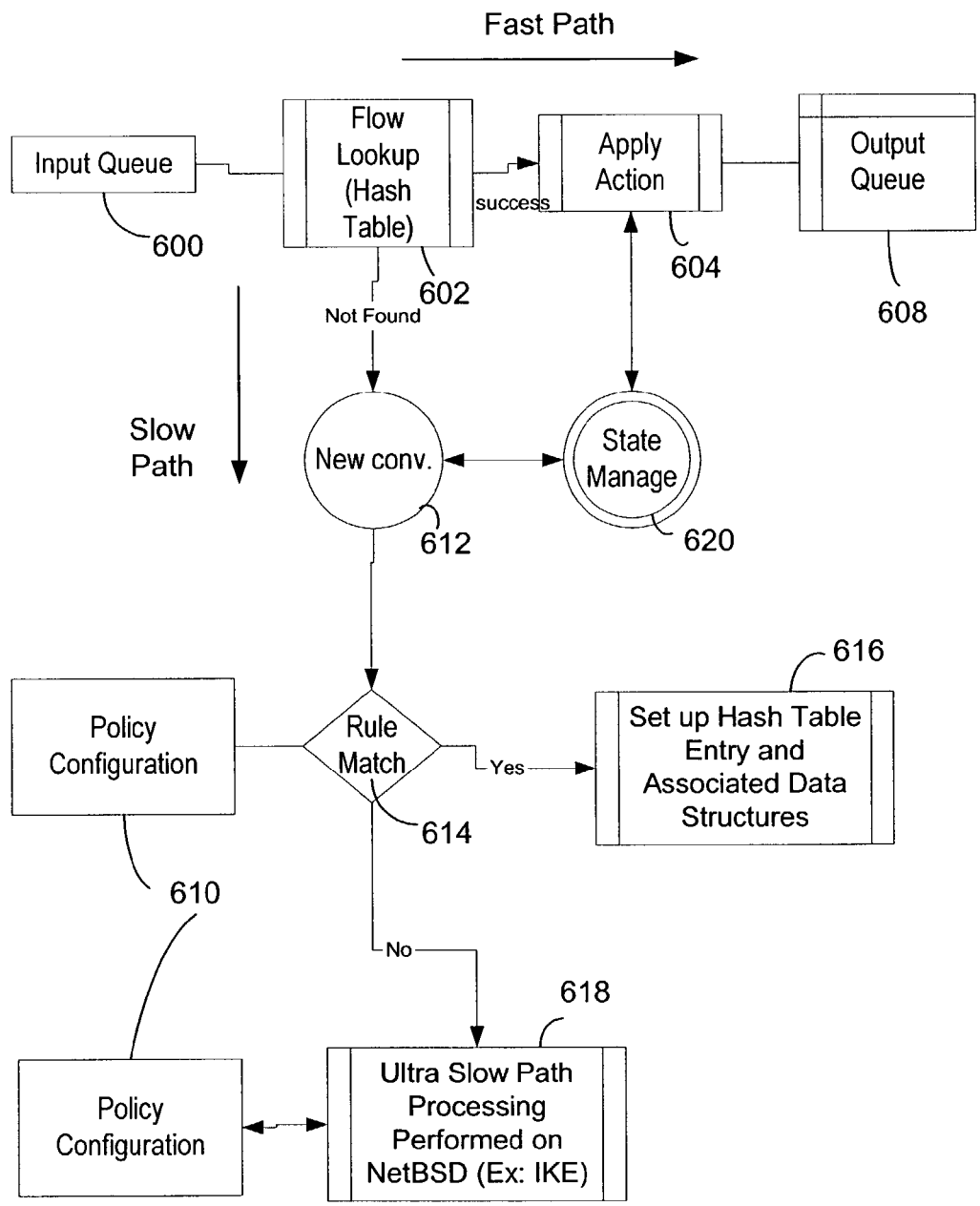
FIG. 6a is a block diagram illustrating the fast path and slow path processing of packets in the system of the present invention.

The use of the flow tables allows for packet processing to be rapidly directed to appropriate processors performing application specific processing. Nevertheless, initially, the route of the packets through the processing pipelines must be determined. As shown in FIG. 6a, packets and flows can follow a "slow" or "fast" path through the processors. The identification process defines a "slow path" for the packet, wherein the processing sequence for the flow must be set up as well as the specific requirements for each process. This includes performing a policy review based on the particular subscriber to whom the flow belongs, and setting up the flow to access the particular service or series of services defined for that subscriber. A "fast path" is established once the flow is identified and additional packets in the flow are routed to the service processors immediately upon identification for processing by the compute elements.

This slow path versus a fast path distinction is found in many of the applied services. For example, in the case of routing, the first packet of a flow may incur additional processing in order to allow the system to look up the appropriate next hop and output interface information. Subsequent packets in the flow are quickly identified and forwarded to the next hop and output interface non-performing routing information look-ups again. Similar "slow" and "fast" path models are applied in the provision of other services.

Flows are organized into a conversation model. In a conversation, two parties are supported: an initiator and a respondent. Each conversation is a model of a user session, with a half-conversation corresponding to an initiator or a responder. Each half conversation has a control channel and data channel, so that there are four total flows in total.

Figure 6B:
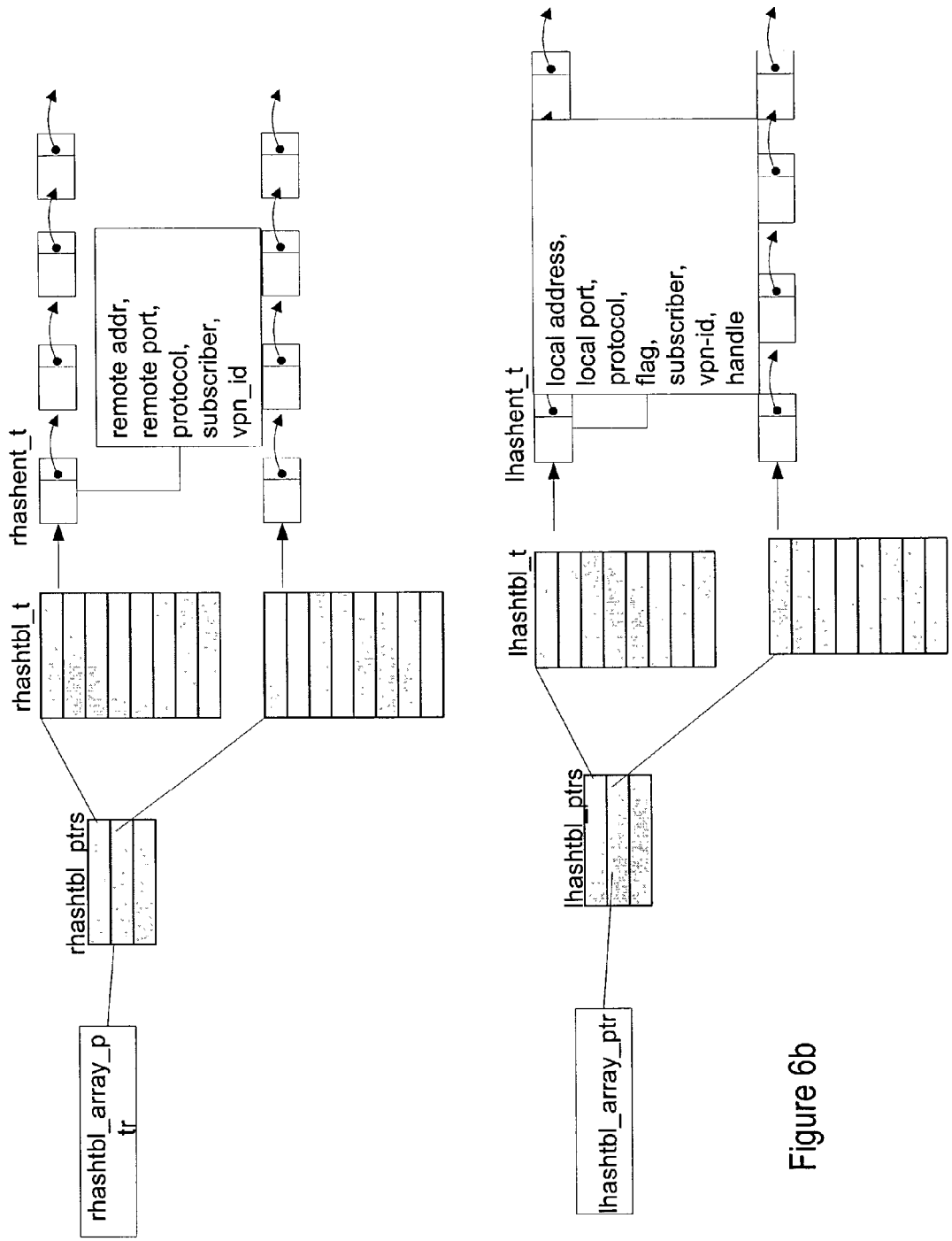
FIG. 6b is a diagram illustrating one of the data structures used in the system of the present invention.

Returning to FIG. 6a, the slow path/fast path distinction in the present system is illustrated. When the first packet of a new conversation enters the system via the input queue 600, the flow lookup 602 will fail and a slow path process is taken where new conversation processing 612 is performed. The new conversation processing involves rule matching 612 based on a policy configuration 610 on the applicable policy. If a particular conversation is allowed, then a conversation object is created and state memory is allocated for the conversation. The flow objects are created and entered into the flow table 616. If the rule match determines that the conversation is not part of a flow which can be processed by the service compute elements, the packets require further processing which is performed on one of the processors of the Control Authority 618, such as IKE. This processing is implemented by consulting with the policy configuration 610 for the subscriber owning the packet. An exemplary set of flow tables is represented in FIG. 6b. In FIG. 6b, two tables are shown: a remote hash table (rhasttbl) and a local hash table (lhastbl). Remote hash table includes remote object flow identification information, such as the remote address, remote port, protocol, subscriber and VPN identification. The local hash table contains internal flow data and subscriber specific information, such as the local address, local port, protocol, flag, subscriber VPN identification, and a handle (whose usage is described below).

When additional packets in the flow arrive, the flow table lookup will succeed and the fast path will be taken directly to the service action processor or processing pipeline, allowing the service to be applied with much greater speed. In some cases, a conversation manager is consulted. Following application that a particular service, the packet exits at the system via an output queue.

Returning again to the service architecture of FIG. 5, an additional module shown in the service architecture is the conversation handler 332. Conversation handler 332 is responsible for creating, maintaining, operating, and destroying conversation and half conversation objects.

Flow table handler 334 is responsible for adding and deleting flow objects from the flow table.

Policy management module 336 allows policies for a particular subscriber to be implemented on particular flows and has two interfaces: one for policy configuration and one for conversation creation. Policy configuration module 336 matches network policy rules for a particular subscriber to application processing in content services layer 360. Conservation handler 332 consults the policy database and performs rule matching on newly arrived packets. In essence, when a packet associated with a particular subscriber arrives, if it the packet takes the slow path, conversation handler 332 determines whether the packet matches any policies in place for the particular subscriber in order to forward the packet through the correct processing pipeline for that particular subscriber.

Service state memory manager 338 allows any service in the service architecture to attach an arbitrary service-specific state, where data for the state is managed by the state module. Thus, the allocated state objects can be attached on a per flow basis, per half conversation basis, or per conversation basis. States that are outside the conversation such as, for example, remote procedure call (RPC) port mappings, are dealt with separately.

The application data parser 340 provides a common application data parsing routine. One example is a Telnet protocol.

Finally, a TCP data reconstruction module 346 ensures that data seen by application service modules 360 are exactly the same data seen by final destination servers. An anti-replay defense may be implemented using TCP data reconstruction module 346 as well.

At the top of the architecture stack shown in FIG. 5 are application service modules 360.

In the version of NetBSD running on the Control Authority, the Ethernet driver has been changed to match a simple Mac interface, where it gets and puts packets from a pre-assigned block of memory. Hence IP addresses are assigned to these NetBSD CPUs and the programs are run as if they are multiple machines. Inter NetBSD CPU communication is done by using loopback addresses 127.0.0.*. IKE/PKI and the management CPU has the real IP addresses bound to their interfaces.

The MAC layer is aware of the IP addresses owned by the NetBSD CPUS and shuttles packets back and forth.

Each management CPU runs its components as pthreads (Single Unix Specification Threads). In the embodiment shown in FIG. 4, the CPUs communicate with the compute element CPUs through UDP sockets; this is done so that the processes/threads on the NetBSD CPUs can block and not waste CPU cycles.

The security of subscriber traffic is maintained by using VLAN tagging. Each subscriber is assigned a unique VLAN tag and the traffic from the subscribers is separated out using this VLAN tag. In one embodiment, the content services aggregation device is assumed to be in place between the physical WAN switch and a layer 2 switch coupled between the device and the data center. The VLAN table reflects tags at the downstream Layer 2 switch and is configured at the aggregator by the operator.

Figure 8:
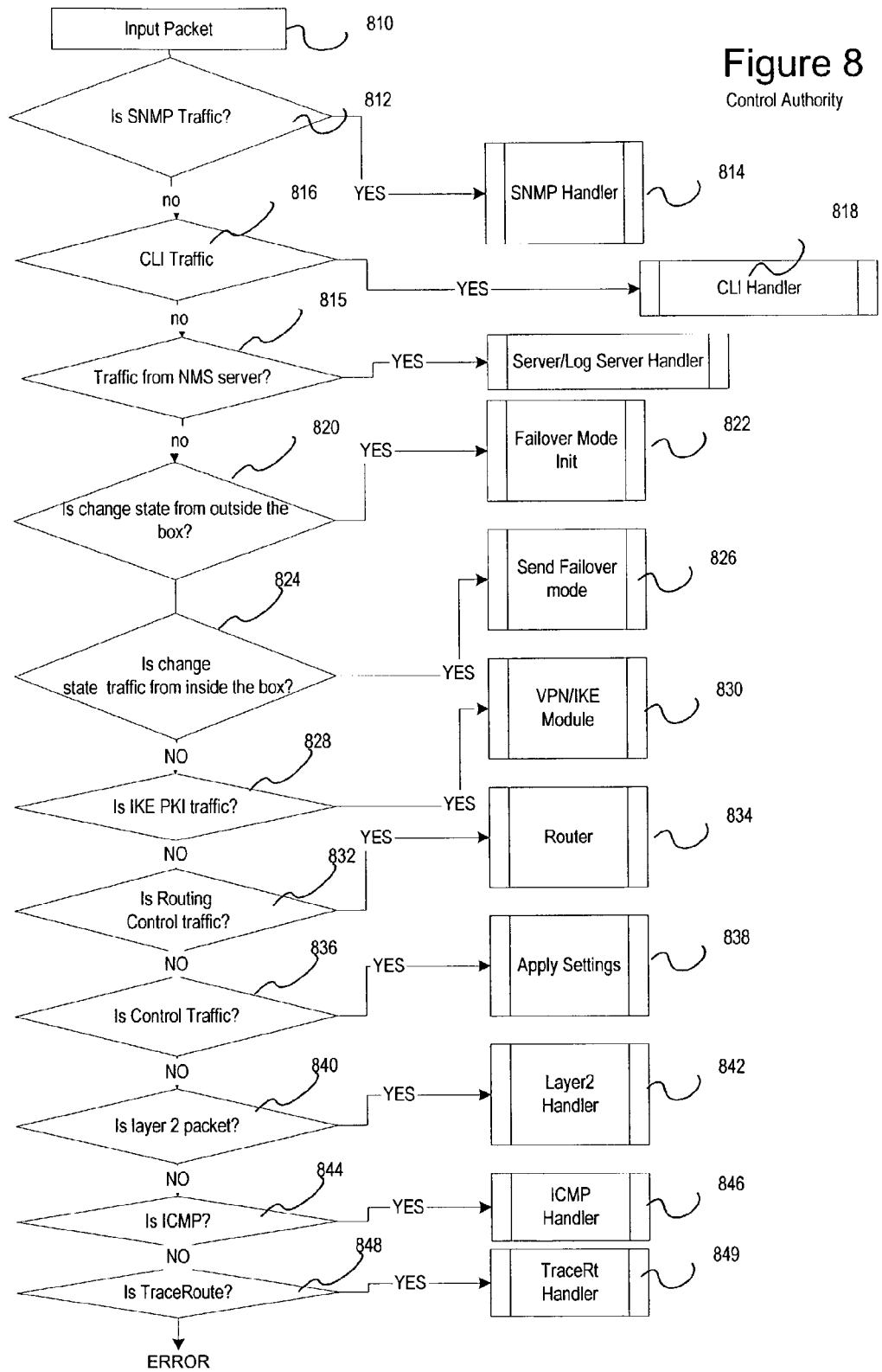
FIG. 8 is a flowchart depicting processes running in a processing element designated as a Control Authority processor and the classification of traffic to processes running in the Control Authority processor.

Operation of the Control Authority on the different types of traffic is illustrated in FIG. 8.

As a new packet enters Control Authority 100a at step 810, the Control Authority determines what type of traffic the new packet is and routes the new packet to one of a number of function handlers accordingly. If Control Authority 100a determines that the traffic is SNMP traffic, at step 812 the traffic is forwarded to an SNMP handler at step 814. If Control Authority 100a determines that the traffic is Command Line Interface (CLI) traffic at step 816, the traffic is forwarded to a CLI handler at 818.

If the traffic is from the Network Management System server at step 815, the traffic is forwarded to a Log Server handler at 817. If the traffic is change of state traffic from outside of the content services aggregator at step 820, it is routed to a failover handler 822. Likewise, if the aggregator is sending change state traffic inside of the aggregator, at step 824 the result is affirmative, and it is forwarded to the failover mode initialization handler at 826. In this sense, failover refers to a service applicable when multiple content services aggregators are coupled together to allow performance redundancy. They may be configured as master-slave or peer-to-peer and upon failure of one of the devices, the failover handler will coordinate one device taking over for another.

At step 828, a determination is made as to whether the traffic is IKE/PKI traffic and if so, the traffic is forwarded to the IKE/PKI module, discussed in further detail below. If the traffic comprises routing instructions, as determined at step 836, the traffic is handled by the router module at 834. If the traffic is control traffic, at step 836, the particular control settings are applied 838. If the traffic is a layer 2 packet, it is handled by a layer 2 handler at 842. And if the packet is an ICMP packet, it is handled by an ICMP handler at 846. Finally, if the packet is a trace route packet 848, it is forwarded to a tracert (trace route) handler at 849. If it cannot be determined what type of packet type is present, an error is generated and the packet dropped. It should be understood that the ordering of the steps listed in FIG. 8 is not indicative of the order in which the determination of the packets is made, or that other types of functional determinations on the packet are not made as packets enter the Control Authority.

Processing Pipelines

As noted above, the system supports a plurality of application service modules 360. As shown in FIG. 5, application service modules 360 may include a Firewall module 362, a NAT module 364, an IP forwarding (OSPF, static and RIP Routing) module 366, a Bandwidth Management module 368, an SSL Encryption/Decryption module 370, a Web Switching module 372, a Web Caching module 376, and an IPSec Virtual Private Network (VPN) module 374.

In an implementation of the architecture of the present invention wherein the compute elements and crossbar switch of co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, are utilized, IP packets with additional data attached to them may be sent within the system. This ability is used in creating a pipeline of compute elements, shown in FIGS. 7a and 7b.

Figure 7A:
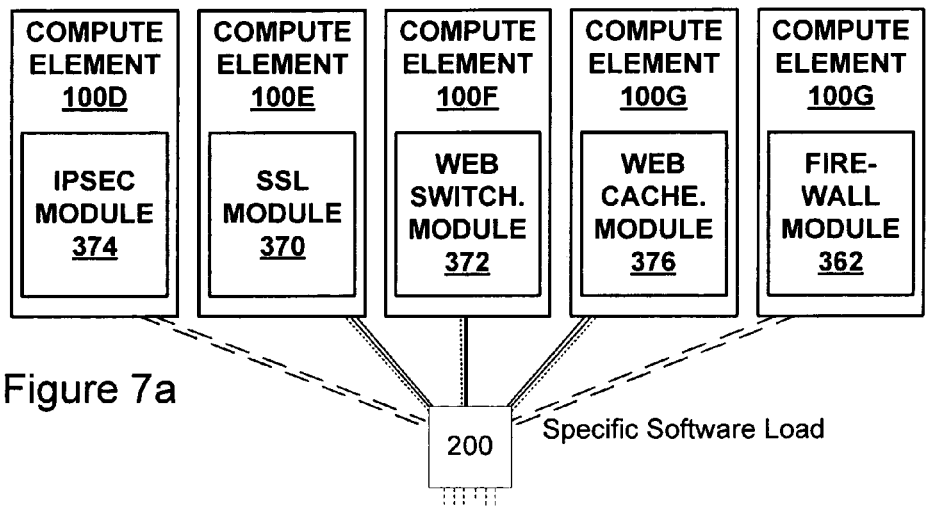
FIG. 7a is a block diagram depicting the functional software modules applied to various processors on a dedicated processing pipeline in accordance with the present invention.

In one embodiment, the processing pipelines are dynamic. That is, any compute element can transfer a processed packet to any other compute element via the crossbar switch. In a fully dynamic embodiment, each compute element which is not part of the control authority can perform any of the services provided by the system and has a full software load (as described briefly above). In an alternative embodiment, the process pipelines are static, and the flow follows an ordering of the compute elements arranged in a pipeline as shown in FIG. 7a in order to efficiently process the services. In this static pipeline, functional application service modules are assigned to specific compute elements, and specific processors within the compute elements may be optimized for computations associated with providing a particular service. As such, the software load for each compute element is controlled by the Control Authority at boot as described above. Nevertheless, the pipelines shown in FIG. 7a are only one form of processing pipeline and the hardware representation therein is not intended to be exclusive or limiting on the scope of the present invention. It should be recognized that this ordering is exemplary and any number of variations of static pipelines are configurable. As illustrated in FIG. 4, the processing pipeline shown in FIG. 7a and the flow pipeline shown in FIG. 7b may be provided on physical cards which may be used as part of a larger system.

As noted briefly above, once a new packet flow enters the input queue and is fed to an input compute element 100b, 100c, a policy matching process performs a rule-matching walk on a per subscriber basis to determine which services are to be applied to the flow. In one embodiment, the flow is then provided to a processor pipeline with specific compute elements designated as performing individual content services applications in cooperation with the Control Authority.

Figure 7B:
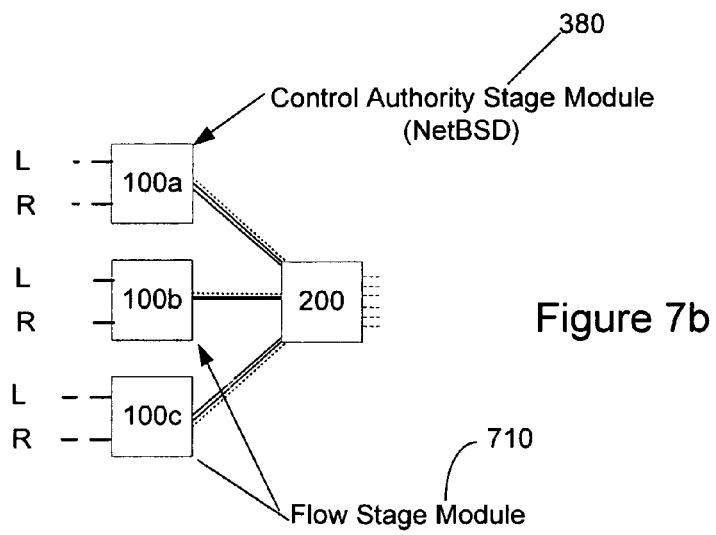
FIG. 7b is a block diagram depicting functional software modules applied to various processors in an input/output pipe in accordance with the present invention.

FIGS. 7a and 7b illustrate generally the mapping of the particular application module to particular process element, thereby forming a process pipeline. As shown in FIG. 7b, two compute elements 100b and 100c perform flow stage operations allowing the system to classify flow and conversation packets. Processor 100a represents the Control Authority NetBSD compute engine. FIG. 7a shows the application modules operating on individual processors. In one embodiment, each compute element may be optimized for implementing one of the content services applications. In an alternative embodiment, a dynamic pipeline may be created wherein the compute elements can perform one or more different network services applications, and each element used as needed to perform the individual services. In FIG. 7a, processor 100d is optimized to cooperate with the Control Authority to perform IPSec utilizing the IPSec module. This includes performing security association database (SADB) lookups, IPSec encapsulation, bandwidth management, QoS, and forwarding. Compute element 100h is optimized for Firewall and NAT processing as well as QoS and Webswitching. Likewise, processors 100f, 100g and 100e are utilized for Web switching, Web caching, and SSL optimized computations. In some cases, elements 100d and 100h are referred to herein as "edge" compute elements, as they handle operations which occur at the logical beginning and end of the processing pipeline.

Each of the application services modules cooperates with the Control Authority 380 in the provision of application services. For each service application, this cooperation is different. For example, in IPSec processing, Security Policy Database (SPD) information is stored in the flow stage, wile IKE and PKI information is kept in the Control Authority, and statistics on IPSec and the security association database is maintained in the IPSec stage. In providing the firewall service, IP level check info is maintained in the flow stage, level 4-7 check info is maintained in the firewall module, and time based expiration is maintained in the Control Authority.

In this embodiment, for example, in order to contain the IPSec sequence number related calculations to the shared memory based communication, a single IPSec security association will be mapped to a single Operating System 305 compute element. In addition, in order to restrict the communications needed between the various flows of a "conversation", a conversation will be mapped to a single processing element. In essence, this means that a given IPSec communication will be handled by a single processing pipe.

Flow Stage Module

Figure 9:
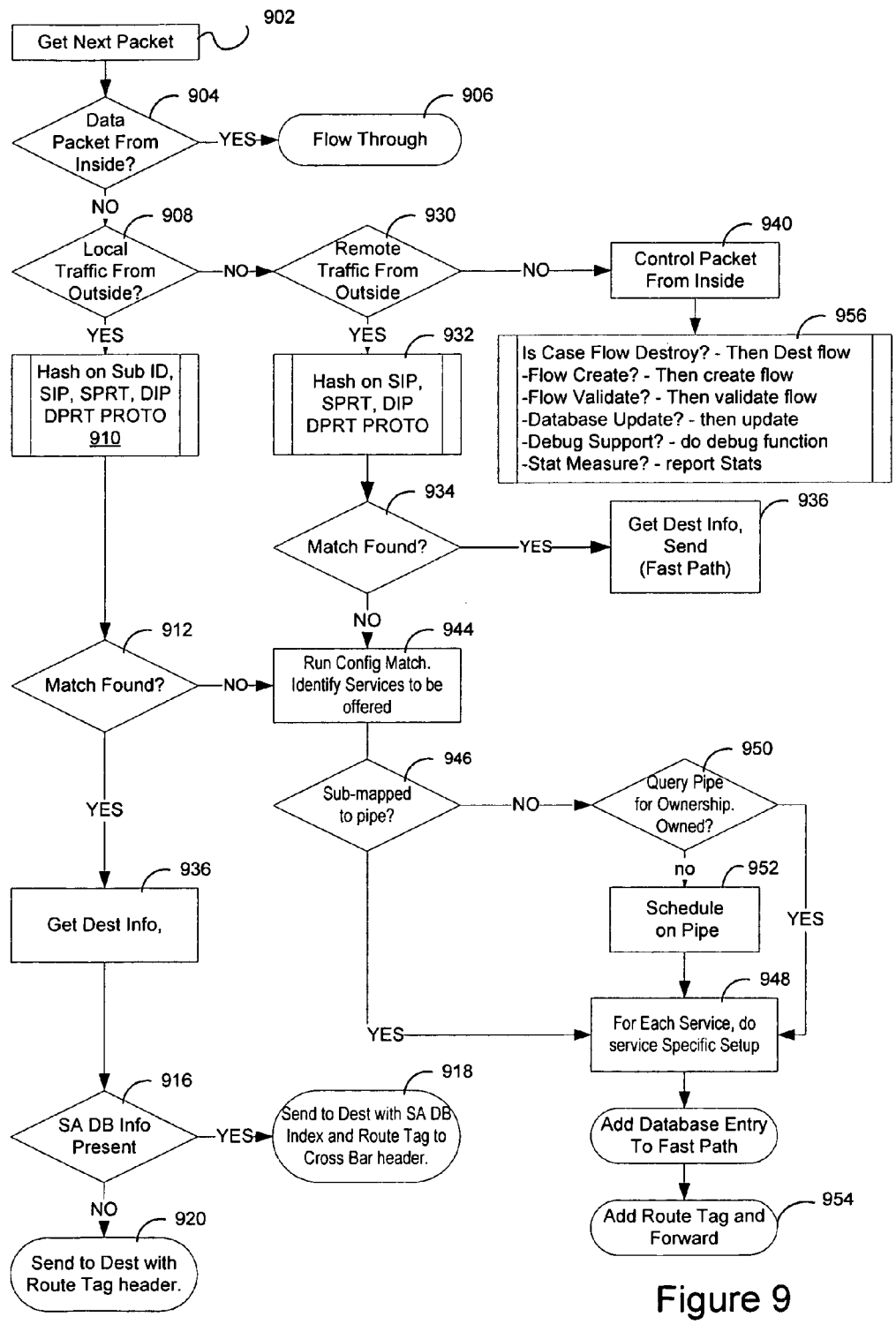
FIG. 9 is a flowchart depicting the flow classification utilized by one input processing element to classify a flow of data packets in accordance with the present invention.

FIG. 7b illustrates the flow stage module as operating on two compute elements 100b and 100c. FIG. 9 illustrates the process flow within the flow stage. The flow stage module is responsible for identifying new flows, identifying the set of services that needs to be offered to the flow and dynamically load balancing the flow (to balance throughput, memory usage and compute usage) to a pipeline of compute elements. In doing so, the flow stage also honors the requirements laid out by the above items. Flow stage also stores this information in a flow hash table, for subsequent packets in a flow to use.

As new flows are identified, if a new flow requires other support data structures in the allocated compute elements, appropriate functions are called to set up the data structures needed by the compute elements. An example of a data structure for the IPSec security authority process is described below with respect to FIGS. 13-14.

In general, and as described in particular with respect to FIG. 9, for every packet in a flow, the flow hash table is read, a "route-tag" that helps to route a packet via the required compute elements internally to the content service aggregator is added, and the packet is forwarded on for processing.

Certain conventions in the routing are maintained. In general, new flows are routed to processing pipelines such that the traffic through the content service aggregator is uniformly distributed across the available processing pipelines. Flows are distributed to processing pipelines such that the flows belonging to the same security association are sent to the same processing pipeline. New flows are allocated such that a "conversation" (flows, reverse flows and related flows) is sent to the same processing pipeline. In addition, the flow stage checks the SPD policies on new flows and trigger IKE if an IKE-SA/IPSec-SA is not already established.

To bind conversations and a given IPSec security association to single compute elements, the flow stage employs various techniques. In one case, the stage can statically allocate subscribers to processing pipelines based on minimum and maximum bandwidth demands. (For example, all flows must satisfy some processing pipeline minimum and minimize variation on the sum of maximums across various processing pipelines). In an alternative mode, if a subscriber is restricted to a processing pipeline, new flows are allocated to the single pipe where the subscriber is mapped. Also, the route-tag is computed in the flow stage based on policies. The processing can later modify the route-tag, if needed.

The flow routing process is illustrated in FIG. 9. As each packet enters the system at step 902, the system determines the type of the packet it is and routes it accordingly. At step 904, if the packet is determined to be a data packet from inside the content services aggregator, the system understands that the packet is intended to flow through the system at step 906, and the compute elements 100b, 100c are set to a flow through mode. If the packet is not from inside the aggregator at 904, then at step 908 if the system determines that the packet is local traffic from outside of the content services aggregator, the flow table is checked at step 910 and if a match is found at step 912, the destination is retrieved at step 914. If the security association database contains information on the flow at step 916, then at step 918, the packet is forwarded to its destination via the crossbar switch with its security association database index, route tag and crossbar header attached. If the security association database information is not present at step 916, and the packet is forwarded to its destination with only its route tag and the crossbar header at 920.

If no match is found at the checking the hash flow table at step 912, then a policy walk is performed wherein the identity of the subscriber and the services to be offered are matched at step 944. If a subscriber is not allocated to multiple pipes, at step 946, each pipe is "queried" at step 950 (using the multi-cast support in the cross-bar switch) to determine which pipe has ownership of the conversation. If one of the pipelines does own the conversation, the pipeline that owns this conversation returns the ownership info at 950 and service specific set-up is initiated at 948. The service specific setup is also initiated if the flow is found to be submapped as determined by step 946. If no pipe owns the flow at step 950, that the flow is scheduled for a pipe at 952. Following service specific setup at 948, a database entry to the fast path processing is added at 953 and at step 954, route tag is added and the packet forwarded.

If the packet is not local at 908, the packet may be remote traffic from outside of the content services aggregator as determined at step 930, the flow table is checked at step 932 and if a match is found, at step 934, the packet is forwarded to its destination at step 936. If the packet is remote traffic from outside the box and a match is not found at step 934, the packet is mapped to its destination at step 944 and an entry is created in the flow table before forwarding the packet to the destination of the packet.

If the packet is a control packet from within the content services aggregator at step 940, the packet is one of several types of control packets and may be included those shown in process 956. These types of control packets may include a flow destroy packet, indicating that a particular flow is to be destroyed. A flow create packet indicating that the particular flow is to be created in the flow table. Other types of control packets include a flow validate packet, database update packets, debug support packets, or load measuring packets.

QOS (Quality of Service)

QOS is performed by both the IPSec Modules 374 and the Firewall Modules 362 at the flow stage.

In the system of the present invention, bandwidth allocation is performed on a per-subscriber basis. In general, the goal of QOS is to provide bandwidth allocation on a per-system rather than per-interface basis. The minimum guaranteed and maximum allowed bandwidth usage is configurable on a per-subscriber basis. The QOS architecture provides that where an internal contention for a resource makes it impossible to meet the minimum bandwidth requirements for all subscribers, performance should degrade in a manner that is "fair" to all subscribers, and where the system is under-utilized, the extra available bandwidth should be allocated in a manner that is "fair" to all subscribers with active traffic.

The traditional approach to QOS uses an architecture known as Classify, Queue, and Schedule (CQS). When a packet arrives in the system, it is first classified to determine to which traffic class it belongs. Once this classification has been made, the packet is placed in a queue along with other packets of the same class. Finally, the scheduler chooses packets for transmission from the queues in such a way that the relative bandwidth allocation among the queues is maintained. If packets for a given class arrive faster than they can be drained from the queue (i.e. the class is consuming more bandwidth than has been allocated for it) the queue depth will increase and the senders of that traffic class must be informed to lower their transmission rates before the queue completely overflows. Thus, in the CQS architecture, bandwidth control is shared between two loosely-coupled algorithms: the scheduling algorithm maintains the proper division of outgoing bandwidth among the traffic classes and the selective-drop algorithm (a.k.a. the admission control algorithm) controls the incoming bandwidths of the traffic classes.

This traditional architecture does not function well in the multiprocessor system of the present invention. In order to implement a fair scheduling algorithm one would have to monitor (n.s.c) queues, where n is the number of processors, s is the number of subscribers and c is the number of classifications per subscriber. Further, each compute CPU's queues cannot be dealt with in isolation since the per-class-per-subscriber bandwidth guarantees are for the entire compute element, not for the individual CPUS.

The QOS architecture of the present invention determines a set of distributed target bandwidths for each traffic class. This allows the content aggregator to provide bandwidth guarantees for the system as a whole. These targets are then used on a local basis by each flow compute element to enforce global QOS requirements over a period of time. After that period has elapsed, a new set of target bandwidths are calculated in order to accommodate the changes in traffic behavior that have occurred while the previous set of targets were in place. For each traffic class, a single target bandwidth must be chosen that: provides that class with its minimum guaranteed bandwidth (or a "fair" portion, in the case of contention for internal resources); does not allow that class to exceed its maximum allowed bandwidth; and awards a "fair" portion of any extra available bandwidth to that class.

For purposes of the following disclosure, the term "time quantum" (or "quantum") refers to the amount of time that elapses between each synchronization of the admission control state; the term $Min_i$ refers to the minimum bandwidth guaranteed to subscriber i; the term $Max_i$ refers to the maximum bandwidth allowed to subscriber i; the term $B_i$ refers to the total bandwidth used by subscriber i during the most recently completed time quantum; the term $Avg_i$ refers to the running average of the bandwidth used by subscriber i over multiple time quanta; and the term $Total_{i,j}$ refers to the total bandwidth sent from flow Compute element i to P-Blade edge Compute element j during the most recently completed time quantum.

Two additional assumptions are made: the change in $Avg_i$ between two consecutive time quanta is small compared to $Min_i$ and $Max_i$; and the time required to send a control message from a processing pipeline edge compute element to all flow compute elements is very small compared to the round trip time of packets that are being handled by the system as a whole.

Identifying and correcting is the top priority to determine the set of target bandwidths for the next quantum, multiple congestion areas in which a resource may become oversubscribed and unable to deal with all of its assigned traffic are identified.

There are three potential points of resource contention in the system of the present invention: the outbound ports from the flow stage processing pipeline crossbar switch to the service provision processing pipeline compute elements; the inbound port to the service processing pipeline crossbar switch from the edge compute elements (or the computational resources of the edge compute elements themselves); and the outbound ports from the flow stage crossbar switch to the outgoing system interfaces. The first two areas of contention (hereafter known as inbound contention) are managed by the flow compute elements 100b, 100c while outbound interface contention is resolved by the service processing pipeline edge compute elements 100d, 100h. The following description follows the general case of inbound contention. It will be understood by one of average skill that the methods used there can be easily applied to outbound contention.

After the flow compute elements have exchanged statistics for the more recently completed time quantum, the overall bandwidth from each flow compute element to each edge compute element, $Total_{i,j}$, is computed. Resource contention exists for edge compute element j if any of the following constraints are not met:

$$Total_{1,j} + Total_{2,j} \le 1 \text{ Gbit/sec}$$

$$Total_{1,j} + Total_{2,j} \le 1 \text{ Gbit/sec}$$

$$\sum_{i=1}^{4} Total_{i,j} \le 1 \text{ Gbit/sec}$$

Note that this method of contention detection is strictly for the purposes of identifying and correcting contention after it has occurred during a time quantum. Another method is required for detecting and reacting to instantaneous resource contention as it occurs and is described below.

As noted above, one goal of the QOS architecture is that, in the presence of resource contention, the minimum guaranteed bandwidths for each subscriber contending for the resource should be reduced in a manner that is fair to all contending subscribers. More specifically, the allocation of the available bandwidth for a contended resource will be considered fair if the ratio of $Avg_i$ to $Min_i$ is roughly the same for each subscriber contending for that resource:

$$\text{Fair} \Leftrightarrow \forall\, i, j \in \{\text{Contenders}\}: \frac{\text{Avg}_i}{\text{Min}_i} \approx \frac{\text{Avg}_j}{\text{Min}_j}$$

Once contention for a resource has been detected, the contenders' bandwidth usage for the next quantum is scaled back to alleviate the contention and maintain a fair allocation of bandwidth among the contenders. In the case of a single contended resource with a bandwidth deficit of D, a fair allocation is obtained by determining a penalty factor, $P_i$, for each subscriber that is then used to determine how much of D is reclaimed from that subscriber's bandwidth allocation. $P_i$ can be calculated by solving the system of linear equations:

$$\frac{\text{Avg}_1 - P_1 D}{\text{Min}_1} = \cdots = \frac{B_n - P_n D}{\text{Min}_n}$$

$$\sum_{i=1}^{n} P_i = 1$$

The above equations yield ideal values for the set of penalty factors in the case of a single contended resource. In the case of m contended resources, a nearly ideal set of penalty factors can be found by solving the system of linear equations:

$$\frac{\text{Avg}_1 - P_{1,1}D_1 - \cdots - P_{1,m}D_m}{\text{Min}_1} = \cdots = \frac{\text{Avg}_n - P_{n,1}D_1 - \cdots - P_{n,m}D_m}{\text{Min}_n}$$

$$\sum_{i=1}^{n} P_{i,1} = 1$$

$$\vdots$$

$$\sum_{i=1}^{n} P_{i,m} = 1$$

Solving systems of linear equations is a well-studied problem and the best algorithms have a time complexity of $O(n^3)$ where n is the number of variables. Given that n could be well over 1000, in order to make the system practical for implementation in the present invention, the following algorithm can be used to find approximate values for the penalty factors. The intuition behind the algorithm is that the systems of linear equations shown are being used to minimize, for all contenders, the quantity:

$$\text{abuse}_i = \frac{\text{Avg}_i - P_i D - \cdots - P_{1,m} D_m}{\text{Min}_i} - \frac{\sum_{j=1}^{n} \frac{\text{Avg}_j - P_j D - \cdots - P_{1,m} D_m}{\text{Min}_j}}{n}$$

The algorithm divides D into s smaller units and penalizes by D/s the subscriber with the highest calculated abuse value during each of s iterations. Since it takes O(n) operations to determine the subscriber to penalize for each iteration, the time complexity of this algorithm is O(sn), or simply O(n) if s is fixed. In practice, abuse will not actually be calculated; identifying the subscriber with the highest ratio of penalized average bandwidth to minimum bandwidth is equivalent.

Unfortunately, not all traffic-shaping decisions may be postponed until the next time quantum. In the case of resource contention, it is possible for the packet buffers in the flow and edge compute elements to overflow from the cache in a time period that is much smaller than a full time quantum. In the case of inbound contention, there can be up to 1 Gbit/sec of excess data being sent to a contended resource. Assuming the worst case of 64 byte packets and that 300 packets will fit in an compute element's cache (remember that all packets require a minimum of one 512-byte block), an overflow condition may occur in as quickly as:

$$\frac{300 \text{ packets} \cdot 64 \text{ bytes/packet} \cdot 8 \text{ bits/byte}}{1 \text{ Gbit/sec}} \approx 150\ \mu\text{sec}$$

This amount of time is about 40 times smaller than the proposed time quantum so it will be necessary to detect and handle this situation before the current time quantum has expired.

The choice of time quantum has a direct impact on the performance of the QOS architecture. If the value is too small, the system will be overloaded by the overhead of exchanging state information and computing new target bandwidths; if the value is too large, the architecture will not be able to react quickly to changing traffic patterns.

As a starting point, the largest possible quantum that will still prevent a traffic class with the minimum possible bandwidth allocation from using more than its bandwidth quota during a single quantum is used. Assuming that the 5 Mbits/sec as the minimum possible bandwidth for a class and that this minimum is to be averaged over a time period of 10 seconds, the choice of time quantum, q, is:

$$q = \frac{5 \text{ Mbits/sec} \cdot 10 \text{ sec}}{8 \text{ Gbits/sec}} = 6.25 \text{ msec}$$

This parameter may be empirically tuned to find the ideal balance between responsiveness to changing traffic patterns and use of system resources.

Since maintaining a true moving average of the bandwidth used on a per-subscriber basis requires a good deal of storage space for sample data, the Exponential Weighted Moving Average (EWMA) is used.

The EWMA is calculated from a difference equation that requires only the bandwidth usage from the most recent quantum, v(t), and the previous average:

$$Avg_i(t) = (1-w) Avg_i(t-1) + wv(t)$$

where w is the scaling weight. The choice of w determines how sensitive the average is to traffic bursts.

In general, in implementing the aforementioned QOS architecture, the system includes a flow stage QOS module, an IPSec stage outbound QOS module, an IPSec stage inbound QOS module, a firewall stage outbound QOS module, and a firewall stage inbound QOS module.

The flow stage QOS module is responsible for keeping statistics on the bandwidth consumed by subscribers that it sees. Time is divided into quantum and at the end of each quantum (indicated through a control message from the Control Authority), statistics are shared with the other flow stages, including the split of the bandwidth by service processing pipelines. This enables each flow stage to have an exact view of the bandwidth consumed by different customers/priorities. Bandwidth maximum limits and contention avoidance are enforced by calculating drop probability and applying it on packets that pass therethrough.

In implementation, the flow stage QOS module will use a number of variables (where each variable has the form "variable [id1] [id2]. . . [id(n)]" and such variables may include: bytes_sent[cpu][subscriber][color][p-ipe], number_of_flows[subscriber][color][p-pipe], drop_probability[subscriber][color][p-pipe], and bytes_dropped[cpu][subscriber][color][p-pipe] where the id "color" refers to the packet priority.

When time quantum messages are received from the Control Authority, the CPU will sum up the statistics and send to the CA and other CPUs to generate (bytes_seen[subscriber][color][p-pipe]). The CLI cpu will also send messages to the compute-CPUs to reset their counters. The flow stage module will also calculate the bandwidth usage in the last quantum and determine whether any maximums are exceeded. If so, it will calculate the drop probability in shared memory. Compute CPUs use it as soon as it is available. Next, the flow stage will calculate cumulative bytes_sent[p-pipe], if a processing pipeline is over subscribed, it will calculate drop probability drop_probability[subscriber][color][p-pipe] in shared memory. Compute elements in the service pipeline use this as soon as it is available. The variable bytes_sent[p-pipe] is used in assigning new flows to processing pipelines. If the processing pipeline or the cross-bar switch sends a "back-off" message, the flow stage QOS will compute a new drop probability: drop_probability[subscriber][color][p-pipe] using a rule of thumb that the TCP window will reduce the rate by 50% if a packet is dropped. If there are many simultaneous flows, the drop probability is higher and smaller if we have small number of flows currently active. The flow stage QOS will also send alerts when maximum is exceeded, when min is not satisfied due to internal contention, when packets are dropped due to contention. Finally, this stage will keep track of packets dropped and log it to control authority.

The QOS module present on the IPSec compute element of the processor stage inbound and firewall stage inbound QOS module send panic messages back to the Control Authority on overload. A watermark is implemented to ensure that a burst can be handled even after a panic message was sent.

The IPSec stage inbound QOS module and firewall stage inbound QOS module implementations keep track of the queue sizes in the compute CPUs. If a 80% watermark is exceeded send a panic signal to the flow stages. In this stage, there is no need to drop packets.

The IPSec stage outbound QOS module and firewall stage outbound QOS module detect contention on an output interface. The packets that come to this stage (in outbound direction) would be pre-colored with the priority and subscriber by the flow stages. This stage needs to send the packets to the correct queue based on the color. Due to the handling of QOS at the input a backoff really indicates contention for an output port, due to bad luck.

In implementation, the flow stage outbond QOS module will use a number of variables (where each variable has the form "variable [id1] [id2] . . . [id(n)]" and such variables may include bytes_sent[cpu][subscriber][color][interface]. Upon receipt of time quantum messages from the control authority CLI CPU will sum up the statistics and send to the CA and other CPUs: bytes_sent[cpu][subscriber][color][interface]. The CLI cpu will also send messages to the compute-CPUs to reset their counters. The flow stage outbound QOS will then calculate cumulative bytes_sent[interface], if an interface is over subscribed, calculate drop probability: drop_probability[subscriber][color][interface] in shared memory. This information will then be provided to the processing pipeline compute elements to use as soon as it is available. In alternative embodiments, the "use bytes_sent[interface]" value can be used in assigning new flows to interfaces on equal cost paths. Upon receiving a back-off message from a p-pipe, compute new drop probability: drop_probability[subscriber][color][p-pipe] using a rule of thumb whereby the TCP window will reduce the rate by 50% if a packet is dropped. If there are many simultaneous flows, the drop probability is higher and smaller if we have small number of flows currently active. The flow stage QOS will also send alerts when packets are dropped due to contention. Finally, this stage will keep track of packets dropped and log it to control authority.

IPSec Stage Module

The IPSec module 374 is responsible for encapsulating local to remote IPSec traffic and de-capsulating remote-to-local IPSec traffic. For remote-to-local traffic, if needed, IPSec module 374 de-fragments encapsulated IPSec packets before de-capsulation. For local-to-remote traffic, if the packet size exceeds the maximum transmission unit (MTU) IPSec module 374 fragments a packet after encapsulation. Before IPSec module 374 sends the packet to the compute element executing Firewall module 362, the IPSec module 374 module tags the packet with a subscriber identifier and a VPN IKE tunnel identifier. Each subscriber may be entitled to implement firewall rules specific to that subscriber. Once IPSec module 374 establishes an IKE session, the Control Authority sends the security associations to IPSec module 374. IPSec module 374 is responsible for timing out the security association and starting the re-keying process. Control information and policies are downloaded from the Control Authority. IPSec module 374 also supports management information bases, logging, and communication with other compute elements.

Figure 10:
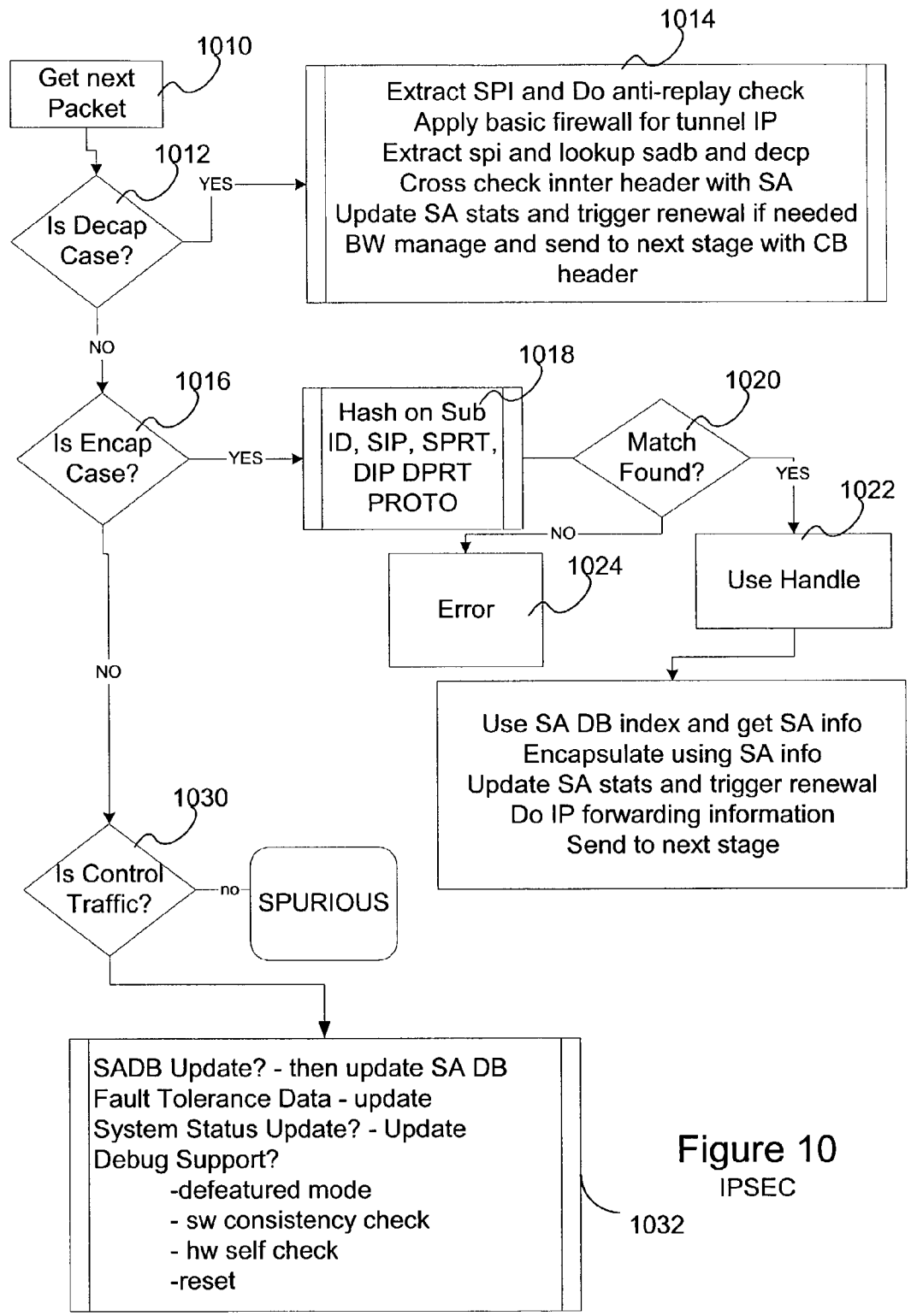
FIG. 10 is a flowchart depicting IPSEC processing occurring in a virtual private network processing stage of the system of the present invention.

In one implementation, IPSec module 374 operates as generally shown in FIG. 10. As each new packet enters IPSec module 374 at 1010, a determination is made as to whether the packet needs to be encapsulated at step 1016 or de-capsulated at step 1012. If the packet is a de-capsulation case, at step 1014, the IPSec module 374 extracts the security parameter index (SPI) and do an anti replay check. IPSec module 374 applies basic firewall rules based on the tunneling IP. IPSec module 374 retrieves the security association (SA) from the security association database; and de-capsulates the packet using the security association. IPSec module 374 cross-checks the internal header with the security association. IPSec module 374 updates the security association status and triggers renewal if needed. IPSec module 374 may also apply bandwidth management rules before sending the packet on to the next compute element processing stage with the crossbar header attached.

If the packet requires encapsulation, at step 1016, IPSec module 374 first determines whether the packet is part of an existing flow by checking the hash flow table at step 1018. If a match is found, IPSec module 374 uses the handle value at step 1022. Then, at step 1026, using the security association database index, IPSec module 374 retrieves the security association, encapsulate the packet using the security association, updates the security association status and, if necessary, triggers a renewal. IPSec module 374 saves IP forwarding information and forwards the packet on to the next stage. If IPSec module 374 does not find a match in the hash table, IPSec module 374 generates an error at step 1024. If the traffic is control traffic as indicated at step 1030, the traffic may comprise one of several types of control traffic including security association database update, fault tolerance data, system update data, or debug support along the systems running the featured mode, triggering a software consistency checked, a hardware self check, or a system reset at 1032.

A more detailed description of the IPSec module is shown and described with respect to FIGS. 12-15, and illustrates more specifically how the Control Authority and the compute elements work together to provide the service in a distributed manner.

Figure 12:
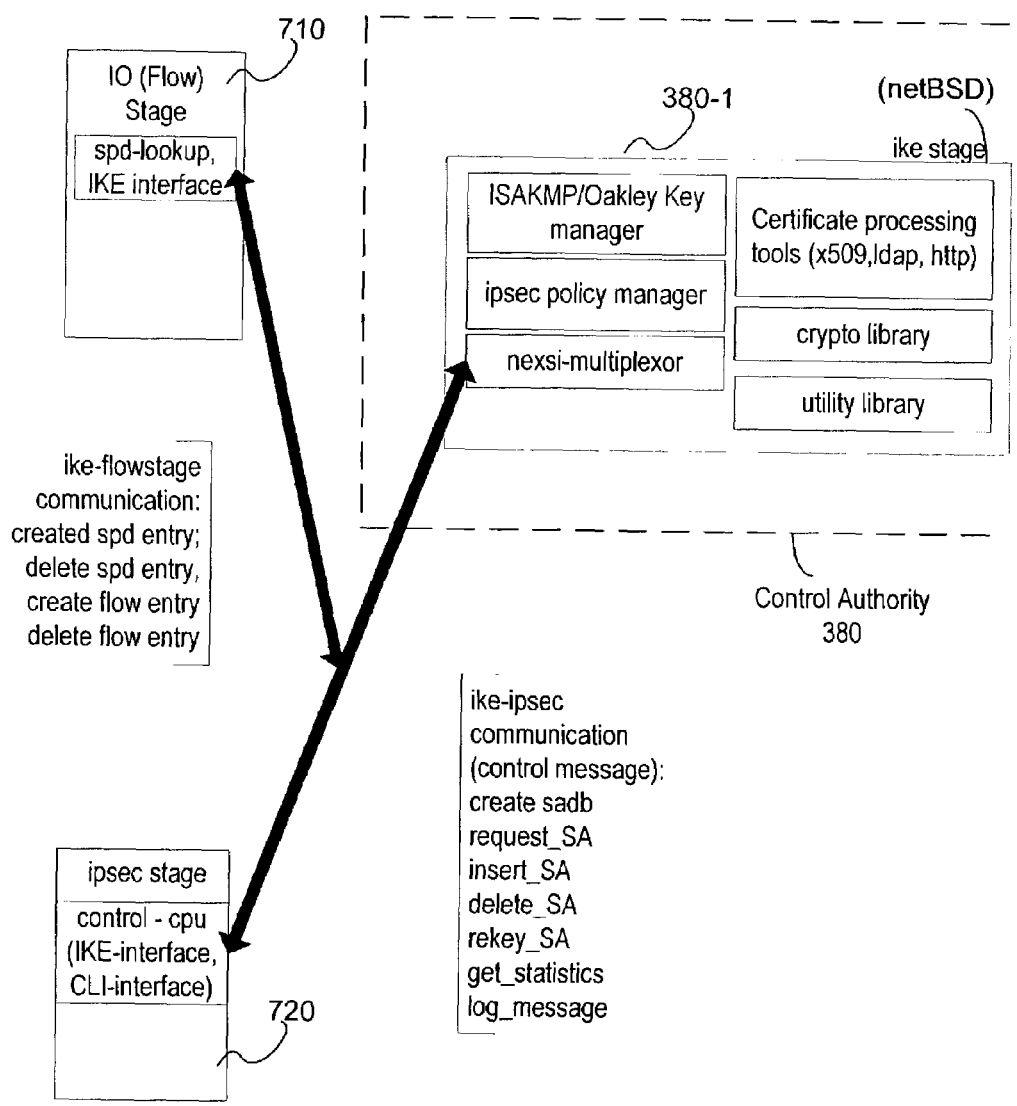
FIG. 12 is a block level overview of VPN processing occurring in the system of the present invention and the communication between various stages and modules.

FIG. 12 is a block diagram illustrating how the flow stage 710, IPSec module 374 and the IKE stage 380-1 running in the Control Authority cooperate to distribute the IPSec service. As shown in FIG. 12, the IKE stage 380-1 of the Control Authority includes an ISAKMP/Oakley key manager, an IPSec policy manager, a multiplexor, certificate processing tools, a cryptography library and a utility library. Flow stage 710, described above, performs the SPD lookups and provides the IKE interface, while the IPSec module 374 provides a command line interface and is the controlling processor for the operation.

If the packet is not a local to remote packet, then the crossbar header is built and the next stage packet is determined from the frame header at step 1418. The next hop MAC address is filled from the hash table data structure and the packet forwarded to the next compute element for processing.

Communication between the flow stage and the IPSec stage 720 will include SPD entry commands, including creation and deletion of SPD entries, as well as flow entry control. Control messages for IKE and IPSec will pass between the IKE stage 380-1 and the IPSec CPU 720. The IPSec stage will retrieve all security association information from the IKE stage 380-1. The flow stage 710 will provide the initial lookups and provide a handle for the packet, as described above with respect to FIG. 10. Once the compute engine receives the packet, the type of processing required is identified. The possibilities include Encryption and HMAC generation, decryption and validation and none. Note that various types of IPSec processing can occur, including Encapsulating Security Protocol (ESP) and Authentication Header (AH) processing.

Figure 15:
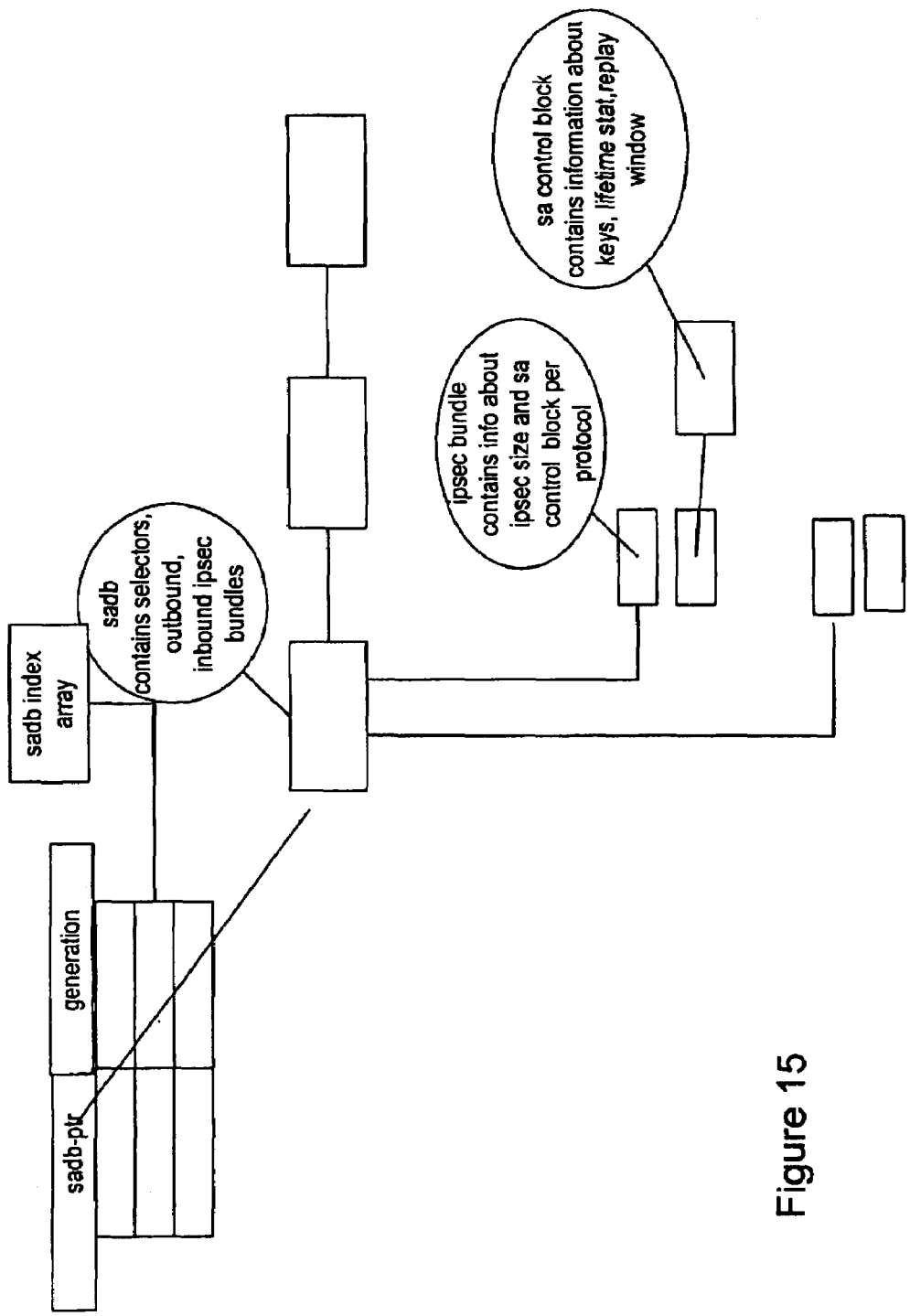
FIG. 15 is a diagram illustrating the data structures configured by the BSD processors running in the Control Authority.

The data structure for the security association database is illustrated in FIG. 15. As shown therein each security association includes a database pointer sadb-ptr to the security association database. Each data entry contains selectors as well as inbound and outbound IPSec bundles. Each IPSec bundle contains information about IPSec size and security association control blocks. Each control block contains information about security keys, lifetime statistics and the replay window.

Figure 13:
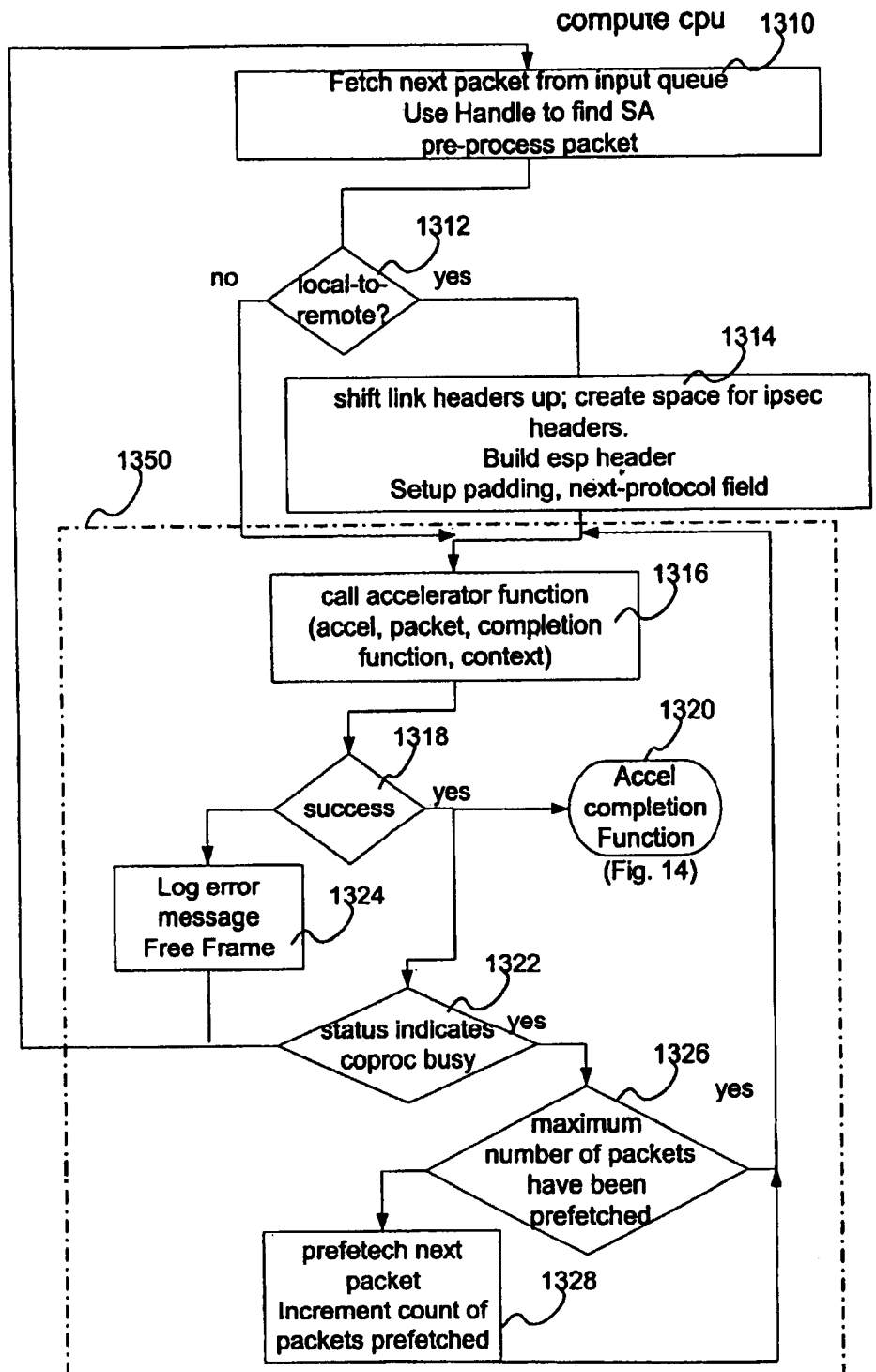
FIG. 13 is a flowchart representing processing in accordance with the VPN processing stage using IKE and PKI.

The particular implementation of IPSec processing on the compute engine (and by reference therein to the control stage 380-1) is shown in FIG. 13. As shown in FIG. 13, the compute CPU fetches the next packet from its input queue. (This operation will vary depending on the nature of the hardware running the system of the present invention.)

At step 1310, using the handle provided by the flow stage, the CPU will find the security association for the packet and preprocess the packet. If the packet is a local to remote packet (a packet destined for the Internet), as determined at step 1312, the CPU at step 1314 will shift the link headers, create space for IPSec headers in the packet headers, build an ESP header, set padding and set the next protocol field.

At this stage, the packet is ready for encryption. In a general hardware implementation, the encryption algorithm proceeds using the encryption techniques specified in the RFCs associated with IPSec and IKE and implemented using standard programming techniques on a conventional microprocessor. In one particular implementation using the multiprocessing hardware discussed herein, the encryption technique 1350 is implemented using a compute element with an accelerator: steps 1316,1318, 1320, 1322, 1326 and 1328 are implemented if the software is operated on a compute element in accordance with co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM wherein the compute elements include an application specific co-processor wherein certain service specific functions can be accelerated in hardware, as defined in the co-pending application.

In this implementation the acceleration function is called at step 1316 and if the call is successful at 1318, the co-processor performs the encryption function and completes at step 1320. The status flag indicating the co-processor is busy will be set at 1322, a check will be made at 1326 to determine if the maximum number of packets has been prefetched and if not packets will be pre-fetched (step 1328) for continued processing as long as the minimum number of packets has not been reached (at step 1326). If the call for the accelerator function fails, an error will be logged at 1324.

Figure 14:
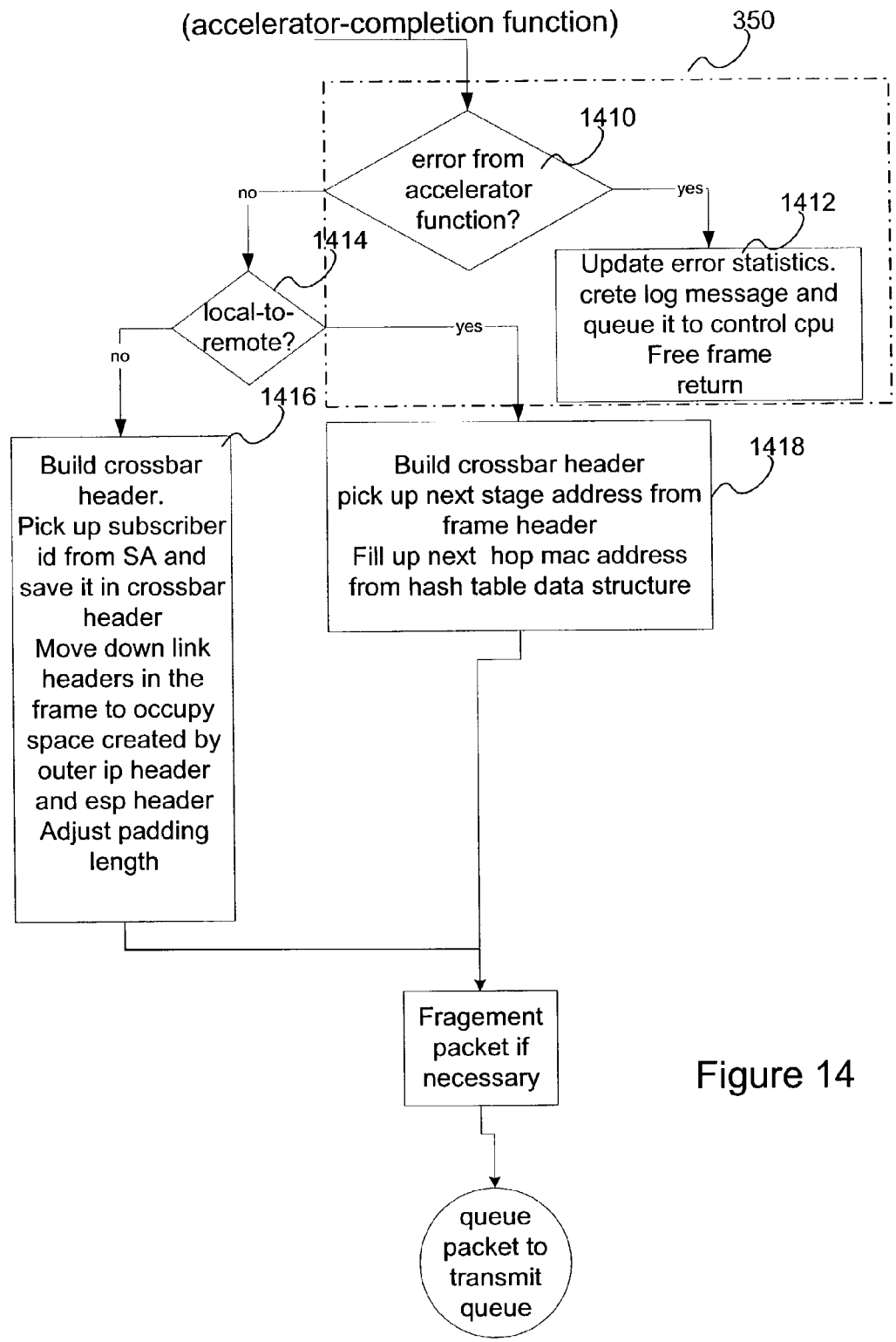
FIG. 14 is a flowchart representing processing of a packet after completion of the encryption and decryption in the packet processing stage of FIG. 13.

FIG. 14 shows the completion of the encapsulation function. Once the packet had been encapsulated, if no errors (at step 1410) have occurred in the encapsulation accelerator, or upon completion of the conventional encryption process, if the packet is determined to be a local to remote packet at step 1414, then at step 1416, the cross bar header will be added, the subscriber identifier will be determined from the security association and saved in the crossbar header. The packet will be fragmented as necessary and transmitted to the compute element's output queue.

If the packet is not a local to remote packet, then the crossbar header is built and the next stage packet is determined from the frame header at step 1418. The next hop MAC address is filled from the hash table data structure and the packet forwarded to the next compute element for processing.

It should be noted that each security association can consist of multiple flows and all packets belonging to a security association are generally directed to one compute element. The security policy database is accessible to all compute elements, allowing all compute elements to do lookups in the database.

Firewall Stage Module

The firewall stage performs a number of functions. For local to remote non-IPSec traffic the stage performs stateful Firewall, forwarding and NAT. In addition, for local to remote IPSec traffic, the stage performs basic egress firewall for tunnel IP and forwarding for tunneling packets. For remote to local traffic, the stage performs (de)NAT, Firewall, Forwarding, and bandwidth management.

This stage also receives forwarding table updates and downloads policies from the Control Authority. Support for MIBs, logs and communication to other compute elements are also present in this stage.

Figure 11:
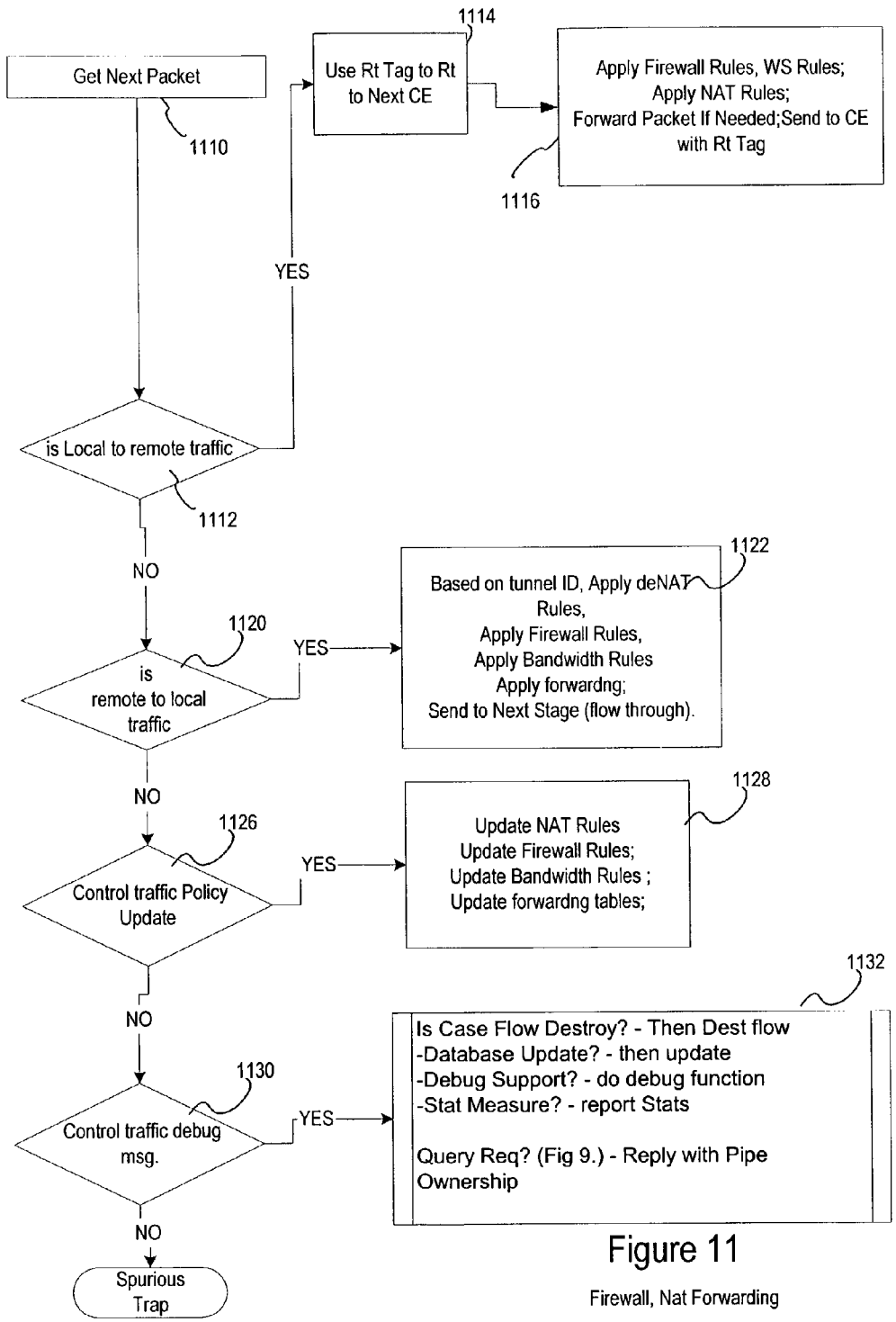
FIG. 11 is a flowchart depicting firewall and NAT processing occurring in one pipeline of processing elements in accordance with the system of the present invention.

FIG. 11 illustrates operation of the Firewall stage. As each packet arrives at step 1110, a determination as to the source and destination of the traffic is made and if the packet is local to remote traffic, at steps 1112 and 1114, a second determination is made If the packet is local to remote traffic the route tag is used to route the packet to the next available compute element and Firewall, web switching and NAT rules are applied. The packet is forwarded to other compute elements, if needed, for additional service processing, and routed to the crossbar switch with a route tag at 1116

If the packet is remote to local traffic at step 1120, based on the tunnel ID of the packet, NAT lookups and mappings are applied (deNat), firewall, subscriber bandwidth (QOS) and forwarding rules are applied and the packet is passed to the next stage in flow through mode.

If the packet is control traffic indicating a policy update, NAT, Firewall, or bandwidth rules are updated, or the forwarding tables are updated at 1128.

Finally, if the traffic is a control message at 1130, the particular control instruction is run at 1132. If the packet is none of the foregoing, a spurious trap is generated.

Routing

In a further aspect of the present invention, the architecture provides a number of routing functions, both internally and for routing between subscribers and the Internet (or other public addresses). The system supports Open Shortest Path First (OSPF) routing protocol.

Figure 16:
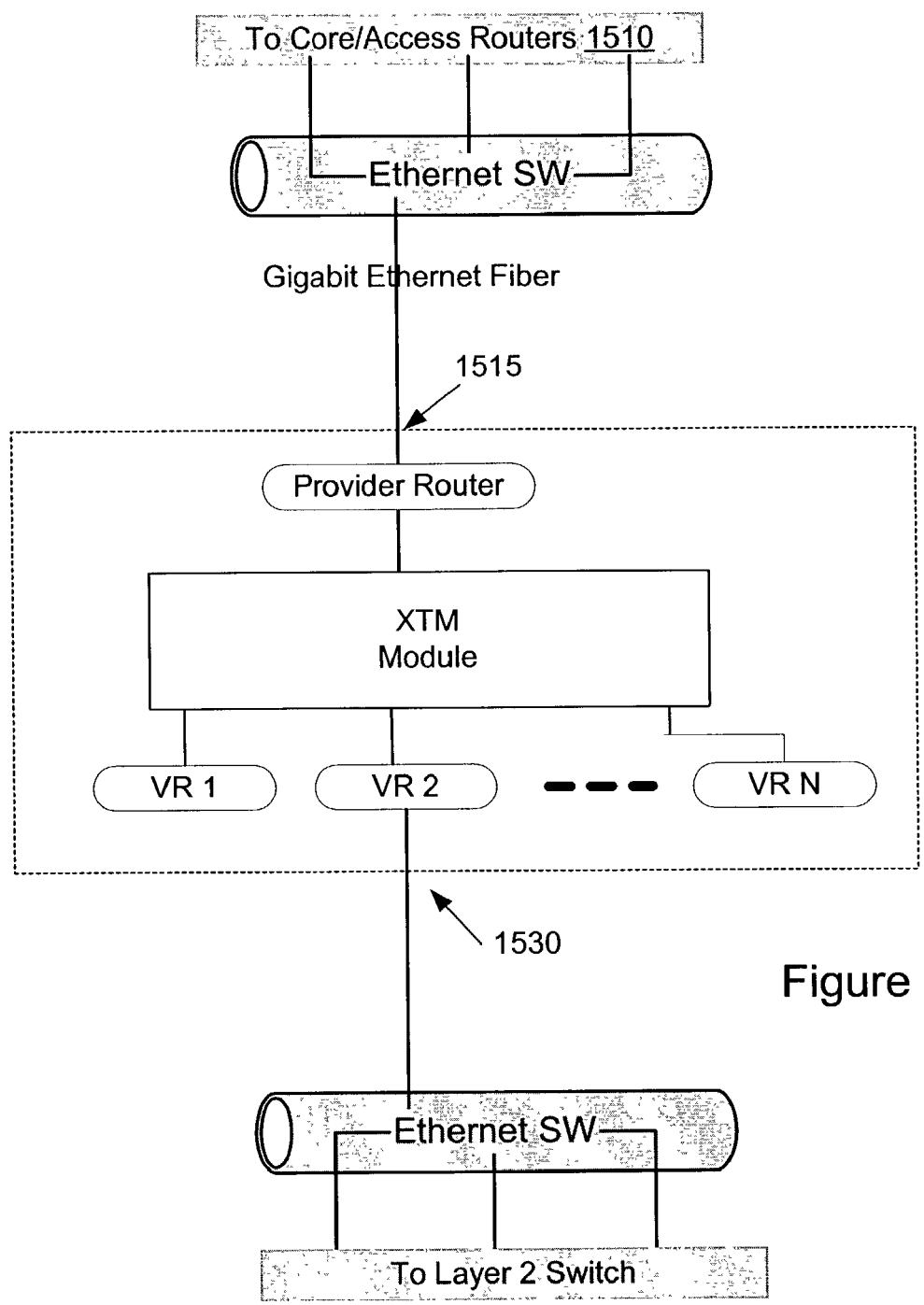
FIG. 16 is a diagram illustrating the virtual routing functions of the system of the present invention.

FIG. 16 illustrates a general overview of the routing architecture of the content services aggregator of the present invention. As noted above, physical interface ports of the content services aggregator are labeled as either trusted or untrusted. The untrusted interfaces typically connect to a core or access router used in the data center. The trusted interfaces are further divided into sub-interfaces by the use of 801.1Q VLAN tags. These sub-interfaces provide the fanout into end-customer equipment via layer 2 VLAN switches.

A virtual router handles routing for each subscriber. These virtual routers send the public addresses present in the subscriber's router to the provider router. The subscriber router is responsible for finding a path to the subscriber nodes. The provider routers forward the traffic appropriately upstream to the public addresses. The virtual router also routes traffic from the Internet downstream to the appropriate subscriber. Public addresses in the subscribers are learned at the provider router by injecting the filtered subscriber routes from the virtual router to the provider router.

The virtual private routed network (VPRN) setup from the virtual router's point of view is done through static routers. IKE tunnels are defined first and these correspond to unnumbered point-to-point interfaces for the router. The sub-nets/hosts reachable via such an interface is configured as static routes.

Security of subscriber traffic is maintained by using VLAN tagging. Each subscriber is assigned a unique VLAN tag. The traffic from the subscribers is separated out using this VLAN tag. The tagging is actually done at the port of the downstream L2 switch based on ports. The upstream traffic is tagged according to the subscriber it is destined to and sent downstream to the L2 switch. The VLAN table reflects tags at the downstream L2 switch and is configured at the aggregator by the operator.

The router function is provided by a series of modules. To implement OSPE virtual routers, provider router and steering function, a Routing information Base (RIB), Routing Table Manager (RTM), External Table Manager (XTM), OSPF stack, and Forwarding Table Manager (FTM).

In one embodiment, the a routing stack supports: dynamic and static ARP entries; static route entries (with dynamic resolution); routing and ARP table debugging; dynamic reconfiguration; Out-of-band configuration and private route selection. The OSPF Routing Protocol supports: RFC2328 OSPF Version 2; clear text and cryptographic authentication; debugging output; dynamic reconfiguration through the CLI; route redistribution selection using route-maps and access-lists; and private route selection using route-maps and access-lists.

The OSPF components of the routers run on the Control Authority compute element and build up the XTM. The XTM module is then used to build the RTM which contains the best route across all routing protocols. The RTM module is then used to build the forwarding table, that, in turn, add appropriate routes.

The forwarding table is built in the Control Authority and then distributed across to the compute elements on the processing pipelines. The forwarding table contains the routes learned via OSPF and static routes. The forwarding table is used on the route lookups at the processing pipelines. The forwarding table manager handles fast path forwarding, equal-cost multi-path, and load balancing. Load balancing for equal cost paths is achieved by rotating the path used for each flow through the contending paths for the flow. The flow table has pointers to the forwarding table for the routes that have been looked up.

The VPN table consists of the IP addresses in the subscriber's VPN context. These addresses are sent on the IPSec tunnel providing secure routing across Internet for the VPN set up for the distributed VPN subnets. This IPSec tunnel consists of the end-to-end tunnels between the local and remote gateways. The operator setting up the VPN configures the SPD information.

Where two aggregators are used as a failover pair, a failover module provides failure recovery between a pair of content service aggregators. The master content aggregation device is elected by a leader election protocol based first on priority and secondly on IP address. The backup is the next best switch based on these two parameters. In one embodiment, only one backup is configured and used. Traffic from the subscribers is associated with a virtual router which in turn is associated with a single master/provider router living on a content service device. On failure of the content service aggregator, the backup takes up the functionality of the master. The master alive sent out periodically by the elected master to the other content service in the replication configuration. Failure of the master is detected by absence of a master alive signal or the volunteer release of ownership as master by sending a priority zero master alive to other content service aggregator. The master alive is sent on all the ports on the replication master switch. Also periodically, the OSPF virtual routers' state information, Firewall, NAT and VPN state information is sent across the Failure link directly to the failure links of the other content service aggregators(s). Only the master responds to the packets destined for the subscribers it is currently managing. On the failure of the master, the backup takes over as the master.

The operator configures VLAN table information by copying the tag mapping on the downstream L2 switch. The port tagging is configured on the downstream switch. The VLAN tag is stripped out at the virtual router before sending up the IP stack. Incoming packets from upstream are sent to the public destination address by the provider router. VPN addresses are tunneled through the appropriate IPSec tunnel.

The tunnel information is used to figure out the correct subscriber and thus its VLAN tag is read from the VLAN table. This tag is inserted in the Ethernet packet before sending out downstream.

SSL

In a manner similar to other services provided herein, the SSL module cooperates with the flow stage and the Control Authority to provide SSL encryption and decryption services. In one embodiment, the SSL method employed may be those specified in co-pending U.S. patent application Ser. No. 09/900,515, filed Jul. 6, 2001 by Michael Freed, Elango Ganesen and Praveen Patnala, entitled SECURE SOCKETS LAYER PROTOCOL CUT THROUGH ARCHITECTURE inventors Michael Freed and Elango Ganesen, and hereby fully incorporated by reference herein.

In general, the flow stage will broadcast a send/request query to determine which processing pipeline is able to handle the SSL processing flow. The Control Authority receiving the queues will verify load on all CPUs in the compute elements and determine whether the SSL flows exist for same IP pair, and then select a CPU to perform the SSL. An entry in the flow table is then made and a response to the Control Authority with a flow hint is made. The flow hint contains information about the flow state, the corresponding CPU's ID and index to the SSL Certificate Base. Next, the CPU calculates a hash value for the Virtual ID's Certificate, saves it into SSL Certificate Base and pre-fetches the Certificate's hash entry.

The flow stage will then send the IP packet with hint information in the crossbar switch header to the compute engine. In one embodiment, this means sending the packet to the compute element's MAC which will extract the CPU_ID from the hint. If the CPU_ID is not null, it will put the packet in a particular CPU's queue. If the CPU_ID does not exist, a selection process to select an appropriate CPU may be implemented.

In the implementation using the compute elements of co-pending U.S. patent application Ser. No. 09/900,514, filed Jul. 6, 2001 by Abbas Rashid, Nazar Zaidi, Mark Bryers and Fred Gruner entitled CROSS-BAR SWITCH, each CPU will scan through its CPU input queue to obtain a number of entries and issue pre-fetches for packets. This will remove a packet entry from the input queue and add it to a packet pre-fetch waiting queue. As the CPU is going through packet pre-fetch waiting queue, it will get the packet entry, verify the hint, issue pre-fetch for the SSL Certificate Base (if it is a first SSL packet, then calculate Cert Hash and issue pre-fetch for it), move it to SSL Certificate Base waiting queue. Finally it will retrieve the packet.

The system must respond to the SSL handshake sequence before proceeding with description. The "threeway handshake" is the procedure used to establish a TCP/IP connection. This procedure normally is initiated by one TCP device (the client) and responded to by another TCP device (the server). The procedure also works if two TCP simultaneously initiate the procedure.

The simplest TCP/IP three-way handshake begins by the client sending a SYN segment indicating that it will use sequence numbers starting with some sequence number, for example sequence number 100. Subsequently, the server sends a SYN and an ACK, which acknowledges the SYN it received from the client. Note that the acknowledgment field indicates the server is now expecting to hear sequence 101, acknowledging the SYN which occupied sequence 100. The client responds with an empty segment containing an ACK for the server's SYN; the client may now send encrypted data.

In the system of the present invention, the flow stage will send a SYN packet with Hint information in Mercury header to SSL's MAC CPU, which extract CPU ID from the hint and if it not 0, then put packet to particular CPU's queue. If CPU_ID not exist (0) then MAC CPU use a round-robin type process to select appropriate CPU.

In response the client Hello in the SSL sequence, the system prepares to perform SSL. In the implementation of the present invention, the CPU receives Client Hello and issues a pre-fetch for the security certificate. In response to the Client Hello, the system prepares the compute element for the SHA calculation and the MD5 calculations. Next, an ACK will be sent back to the server using the system architecture TCP. Next, a Server Hello is prepared, and any necessary calculations made using the compute element dedicated to this task. The Control Authority then prepares the server certificate message and sets the compute element for the server certificate message. Finally a server hello done message is prepared with the necessary calculations being made by the compute element and the server hello done is sent.

Next, the client key exchange occurs and the RSA and SHA calculations are performed by the compute element.

When the RSA exponentiation is finished, the handshake hash calculation is performed using the compute element and the master secret is decrypted. The pre-shared keys are derived from the master secret and a finished message is prepared. The packet can then be sent to the processing pipeline for SSL processing. Once the computations are finished, the packed may be forwarded.

When the client is finished sending data, handshake calculations are preformed by the compute element and compared by the Control Authority with the calculated hashes for verification. Alerts may be generated if they do not match.

It will be recognized that other services can be provided in accordance with the present invention in a similar manner of distributing the computational aspects of each service to a compute element and the managerial aspects to a Control Authority. In this manner, the number of flows can be scaled by increasing the number of processing pipelines without departing from the scope of the present invention. These services include Web switching, QOS and bandwidth management.

In addition, it should be recognized that the system of the present invention can be managed using the management system defined in U.S. patent application Ser. No. 09/900, 482, filed Jul. 6, 2001 by Elango Gannesan, Taqi Hasan, Allen B. Rochkind and Sagar Golla, entitled NETWORK MANAGEMENT SYSTEM and U.S. patent application Ser. No. 10/190,036, filed Jul. 5, 2002 by Taqi Hasan and Elango Ganesan, entitled INTEGRATED RULE NETWORK MANAGEMENT SYSTEM. In that system, a virtual management system for a data center, includes a management topology presenting devices, facilities, subscribers and services as objects to an administrative interface; and a configuration manager implementing changes to objects in the topology responsive to configuration input from an administrator via the administrative interface. A graphical user interface designed to work in a platform independent environment may be used to manage the system.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A network appliance to provide a plurality of different network services to a plurality of subscribers of a network data center, the network appliance comprising:
   a plurality of removable compute elements; and
   a switching fabric to forward data packets among the removable compute elements,
   wherein the plurality of removable compute elements include:
      a flow control element to receive a data packet having at least a source address, a destination address and a separate subscriber identifier;
      a removable compute element that executes a conversation handler that applies a policy configuration associated with a first subscriber of the data center to identify a first set of at least two network services to be applied to the data packet when the subscriber identifier of the data packet indicates that the data packet is associated with the first subscriber and that applies a policy configuration associated with a second subscriber of the data center to identify a second set of at least two network service to be applied to the data packet when the subscriber identifier of the data packet indicates that the data packet is associated with the second subscriber;
      a first set of at least two removable compute elements to perform the first set of network services, wherein the first set of removable compute elements are arranged in a first processing pipeline and
      a second set of at least two removable compute elements to perform the second set of network services, wherein the second set of removable compute elements are arranged in a second processing pipeline,
      wherein the flow control element uses the subscriber identifier contained within the data packet to identify the data packet as being associated with one of the subscribers of the data center, and
      wherein the flow control element directs the data packet to a first one of the removable compute elements of the first set of removable compute elements when the data packet is associated with a first one of the subscribers of the data center and directs the data packet to a first one of the second set of removable compute elements when the data packet is associated with a second subscriber of the data center.

2. The network appliance of claim 1, wherein after performing a first one of the network services, the first removable compute element in the first set of removable compute elements dynamically forwards the data packet to a second removable compute element in the first set of removable compute elements for performance of a second network service in accordance with the arrangement of the first processing pipeline.

3. The network appliance of claim 2, wherein the removable compute elements perform the network services and forward the data packet through the removable compute elements in accordance with a pre-defined order of the processing pipeline.

4. The network appliance of claim 1, wherein the first set of removable compute elements is contained within a single removable blade.

5. The network appliance of claim 1, wherein at least one of the removable compute elements comprises a plurality of microprocessors.

6. The network appliance of claim 1, wherein at least one of the removable compute elements includes an application-specific integrated circuit.

7. The network appliance of claim 1, wherein the first removable compute element in the first set of removable compute elements is optimized to perform a first network service in the first set of network services.

8. The network appliance of claim 1, wherein the flow control element dynamically directs the data packet to a removable compute element in the first set of removable compute elements based on a processing load of the first removable compute element in the first set of removable compute elements.

9. The network appliance of claim 1, wherein the first set of network services includes a firewall service.

10. The network appliance of claim 1, wherein the first set of network services includes art Internet Protocol Security (IPSec) service.

11. The network appliance of claim 1, wherein the first set of network services includes a Quality of Service (QoS) service.

12. The network appliance of claim 1,
   wherein the plurality of removable compute elements includes a control authority to load packet processing software on the removable compute elements to configure the compute elements into the first processing pipeline and the second processing pipeline.

13. The network appliance of claim 12, wherein the control authority configures the flow control element by instructing the flow control clement how to direct data packets to the removable compute elements based on subscriber identifiers within the data packets.

14. The network appliance of claim 1, wherein the network appliance provides network services for the subscribers for different geographically distributed facilities of the network data center.

15. The network appliance of claim 1,
   wherein the flow control element analyzes data packets to detect different packet flows within the data packets, and creates entries in a flow table for the flows of the data packets; and
   wherein the flow control element uses the entries in the flow table to direct the data packets to different ones of the removable compute elements.

16. The network appliance of claim 1,
   wherein a the conversation handler that determines whether a flow table includes an entry for a flow of data packets to which the data packet belongs;
   wherein the conversation handler creates an entry in the flow table for the flow of data packets to which the, data packet belongs when the flow table does not include an entry for the flow to which the data packet belongs; and
   wherein the flow control element uses the created entry to direct subsequent data packets to the first or second set of removable compute elements in the same flow as the data packet.

17. The network appliance of claim 1,
   wherein, upon receiving the data packet, the flow control element identifies a set of network services to be applied to the data packet based on the subscriber identifier contained within the data packet and creates a dynamic pipeline by identifying one or more of the removable processing elements that are currently configured to provide the identified network services, wherein die flow control element adds a route-tag to the data packet, and wherein die route-tag causes the data packet to be routed among the identified removable processing elements in the dynamic pipeline, such that the identified removable processing elements apply the identified set of network service, to the data packet.

18. A method for providing a plurality of different network services to a plurality of subscribers of a network data center, the method comprising:

receiving a data packet with a flow control element, wherein the flow control element is a member of a plurality of removable compute elements in a network appliance, and wherein the data packet includes at least a source address, a destination address and a separate subscriber identifier;

determining, with a control authority, whether a flow table includes an entry for a flow of data packets to which the data packet belongs, wherein a set of the compute elements provide the control authority;

identifying, with the control authority, the data packet as being associated with one of the subscribers of the data center based on the subscriber identifier contained within the data packet;

applying, with the control authority, when the flow table does not include an entry for the flow of data packets to which the data packet belongs and when the data packet is associated with a first one of the subscribers, a policy configuration associated with the first one of the subscribers in order to identify a first set of at least two network services to be applied to data packets in the flow of data packets;

creating, with the control authority, when the flow table does not include an entry for the flow of data packets to which the data packet belongs, an entry in the flow table for the flow of data packets, wherein the entry indicates how to direct data packets in the flow of data packets among the removable compute elements such that removable compute elements in a first set of removable compute elements apply each network service in the first set of network services to data packets in the flow of data packets, applying, with the control authority, when the flow table does not include an entry for the flow of data packets to which the data packet belongs and when the data packet is associated with a second of the subscribers, a policy configuration associated with the second one of the subscribers in order to identity a second set of at least two network services to be applied to data packets in the flow of data packets;

creating with the control authority, when the flow table does not include an entry for the flow of data packets to which the data packet belongs and when the data packet is associated with a second one of the subscribers, an entry in the flow table for the flow of data packets, wherein the entry indicates how to direct data packets in the flow of data packets among the removable compute elements such that removable compute elements in a second set of removable compute elements apply each network service in the second set of network services to data packets in the flow of data packets, wherein the first set of removable compute elements apply the first set of network services as a first processing pipeline;

wherein the second set of removable compute elements apply the second set of network services as a second process pipeline;

identifying, with the flow control element, the data packet as belonging to the flow of data packets;

directing, with the flow control element, the data packet to a first removable compute element of the first set of removable compute elements via a switching fabric when the data packet belongs to the flow of data packets and when the entry for the flow of data packets in the flow table indicates that the data packet is to be directed to the first removable compute element of the first set of the removable compute elements;

performing, with removable compute elements in the first set of removable compute elements, the first set of network services when the removable compute elements in the first set of removable compute elements receive the data packet;

directing, with the flow control element, the data packet to a first removable compute element of the second set of removable compute elements via the switching fabric when the data packet belongs to the flow of data packets and when the entry for the flow of data packets in the flow table indicates that the data packet is to be directed to the first removable compute element of the second set of the removable compute elements; and performing, with removable compute elements in the second set of removable compute elements, network services in the second set of network services when the removable compute elements in the second set of removable compute elements receive the data packet.

19. The method of claim 18, wherein a removable compute element in the plurality of removable compute elements comprises a plurality of microprocessors.

20. The method of claim 18, wherein a removable compute element in the plurality of removable compute elements comprises an application-specific integrated circuit.

21. The method of claim 18, wherein a removable compute element in the first set If removable compute elements is optimized to perform a first network service in the first set of at least two network services.

22. The method of claim 18, wherein performing the first set of network services comprises forwarding the data packet from the first removable compute element in the first set of removable compute elements to a second removable compute element in the first set of removable compute elements dynamically.

23. The method of claim 18, wherein performing the first set of network services comprises forwarding the data packet from the first removable compute element in the first set of removable compute elements to a second removable compute elements in the first set of removable compute elements in accordance with a pre-defined order.

24. The method of claim 18, wherein the first set of removable compute elements is housed in a removable blade.

25. The method of claim 18, wherein the first set of network services is not identical to the second set of network services.

26. The method of claim 18, wherein directing the data packet comprises dynamically directing the data packet to the first removable compute element in the first set of removable compute elements based on a processing load of the first removable compute element in the first set of removable compute elements.

27. The method of claim 18, wherein performing the first set of at least two network services comprises performing a firewall service.

28. The method of claim 18, wherein performing the first set of at least two network sevices comprises performing an Internet Protocol Security (IPSec) service.

29. The method of claim 18, wherein performing the first set of at least two network services comprises performing a Quality of Service (QoS) service.

30. The method of claim 18, wherein the method further comprises automatically loading, with the control authority, packet processing software on removable compute elements in the first set of the removable compute elements, wherein the packet processing software causes the removable compute elements in the first set of removable compute elements to perform the first set of network services.

31. A network appliance to provide a plurality of different network services to a plurality of subscribers of a network data center, the network appliance comprising:

a plurality of removable compute elements; and
  a switching fabric to forward data packets among the removable compute elements,
  wherein the plurality of removable compute elements include;
    a first set of at least two removable compute elements to perform a first set of at least two network services, wherein the first set of removable compute elements are arranged in a first processing pipeline,
    a second set of at least two removable compute elements to perform a second set of at least two network services, wherein the second set of removable compute elements are arranged in a second processing pipeline, and
  a flow control element to receive a data packet having at least a source address, a destination address and a separate subscriber identifier,
  wherein the flow control element identifies the data packet as being associated with one of the subscribers of the data &enter by identifying a set of network services to be applied to the data packet based on the subscriber identifier contained within the data packet,
  wherein the flow control element creates a dynamic pipeline by identifying one or more of the removable processing elements that are currently configured to provide the identified network services,
  wherein the flow control element adds a route-tag to the data packet,
  wherein the route-tag causes the data packet to be routed among the identified removable processing elements in the dynamic pipeline, such that the identified removable processing elements apply the identified set of network services to the data packet, and
  wherein the flow control element directs the data packet to a first one of the removable compute elements of the first set of removable compute elements when the data packet is associated with a first one of the subscribers of the data center and directs the data packet to a first one of the second set of removable compute elements when the data packet is associated with a second subscriber of the data center.

* * * * *

UNITED STATES PATENT AND TRADEMARK OFFICE
CERTIFICATE OF CORRECTION

Page 1 of 1

PATENT NO. : 7,363,353 B2
APPLICATION NO. : 10/191746
DATED : April 22, 2008
INVENTOR(S) : Ganesan et al.

It is certified that error appears in the above-identified patent and that said Letters Patent is hereby corrected as shown below:

Column 32, line 52 (Claim 16): "wherein a the" should be -- wherein the --

Column 33, line 4 (Claim 17): "wherein die flow" should be -- wherein the flow --

Column 33, line 6 (Claim 17): "wherein die route-tag" should be -- wherein the route-tag --

Column 33, line 10 (Claim 17): "service," should be -- services --

Column 34, line 42 (Claim 21): "set If removable" should be -- set of removable --

Column 35, line 15 (Claim 30): "set of the removable" should be -- set of removable --

Column 36, line 6 (Claim 31): "&enter" should be -- center --

Signed and Sealed this
Third Day of July, 2012

David J. Kappos
*Director of the United States Patent and Trademark Office*